United States Patent
Nixon et al.

(10) Patent No.: US 11,635,980 B2
(45) Date of Patent: Apr. 25, 2023

(54) MODULAR PROCESS CONTROL SYSTEM

(71) Applicant: FISHER-ROSEMOUNT SYSTEMS, INC., Round Rock, TX (US)

(72) Inventors: Mark J. Nixon, Round Rock, TX (US); Anthony Amaro, Jr., Cedar Park, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 228 days.

(21) Appl. No.: 16/577,053

(22) Filed: Sep. 20, 2019

(65) Prior Publication Data
US 2021/0089354 A1 Mar. 25, 2021

(51) Int. Cl.
*G06F 9/455* (2018.01)
*G06F 9/50* (2006.01)
*G06F 9/54* (2006.01)
*G06F 8/61* (2018.01)

(52) U.S. Cl.
CPC ............ *G06F 9/45558* (2013.01); *G06F 8/63* (2013.01); *G06F 9/505* (2013.01); *G06F 9/541* (2013.01); *G06F 2009/4557* (2013.01); *G06F 2009/45591* (2013.01)

(58) Field of Classification Search
CPC ...... G06F 9/505; G06F 9/541; G06F 9/45558; G06F 8/63; G06F 2009/4557; G06F 2009/45591
See application file for complete search history.

(56) References Cited

U.S. PATENT DOCUMENTS

| | | | |
|---|---|---|---|
| 8,539,061 B2* | 9/2013 | Shi | G06F 16/958 709/223 |
| 10,140,453 B1* | 11/2018 | Fridakis | G06F 21/577 |
| 2009/0049453 A1* | 2/2009 | Baran | G06Q 10/10 719/313 |
| 2013/0204398 A1* | 8/2013 | Minamizawa | H04L 63/101 700/11 |

(Continued)

FOREIGN PATENT DOCUMENTS

EP 3 472 717 A2 4/2019
WO WO-2014/043687 A3 5/2014

OTHER PUBLICATIONS

T.-D. Nguyen, E.-N. Huh, and M. Jo, "Decentralized and revised content-centric networking-based service deployment and discovery platform in mobile edge computing for IoT devices," IEEE Internet Things J., vol. 6, No. 3, pp. 4162-4175, Jun. 2019 (Year: 2019).*

(Continued)

*Primary Examiner* — Jacob D Dascomb
(74) *Attorney, Agent, or Firm* — Marshall, Gerstein & Borun LLP

(57) ABSTRACT

In one aspect, a micro-service control architecture provides a modular, flexible platform for designing, diagnosing, updating and/or expanding process control systems. Each service is containerized to provide portability and isolation from other components of the process control system. In another aspect, a function block diagram includes a "shadow" block that acts as an interface to an external, custom calculation engine, thereby enabling the custom calculation engine to operate synchronously with respect to other function blocks of the function block diagram.

34 Claims, 11 Drawing Sheets

(56) References Cited

U.S. PATENT DOCUMENTS

| | | | |
|---|---|---|---|
| 2015/0095788 A1* | 4/2015 | Thiele | G06F 3/04817 |
| | | | 715/735 |
| 2018/0063286 A1* | 3/2018 | Braga Ameixieira | H04L 41/20 |
| 2018/0173205 A1* | 6/2018 | Miller | G05B 19/41835 |
| 2018/0321662 A1* | 11/2018 | Nixon | G06F 13/4072 |
| 2019/0079804 A1* | 3/2019 | Thyagarajan | G06F 9/45533 |
| 2020/0204463 A1* | 6/2020 | Guan | H04L 63/1441 |
| 2020/0310394 A1* | 10/2020 | Wouhaybi | H04L 67/12 |
| 2020/0409450 A1* | 12/2020 | Hovis | G06F 1/3206 |
| 2021/0004275 A1* | 1/2021 | Avagyan | G06F 9/45558 |
| 2021/0075888 A1* | 3/2021 | Mishra | G06F 9/5088 |
| 2021/0168071 A1* | 6/2021 | Chawki | H04L 45/566 |
| 2021/0195806 A1* | 6/2021 | Kommula | H05K 7/1498 |
| 2021/0250388 A1* | 8/2021 | Wang | H04L 29/08 |

OTHER PUBLICATIONS

Goldschmidt et al., "Container-Based Architecture for Flexible Industrial Control Applications," Journal of Systems Architecture, 84:28-36 (2018).

Gruner et al., "Alternatives for Flexible Deployment Architectures in Industrial Automation Systems," IEEE 23rd International Conference on Emergin Technologies and Factory Automation (ETFA), 1:35-42 (2018).

Search Report for Application No. GB2013936.6, dated Apr. 28, 2021.

Sinha et al., "A Scalable Approach for Re-Configuring Evolving Industrial Control Systems," Proceedings of the 2014 IEEE Emerging Technology and Factory Automation (ETFA), pp. 1-8 (2014).

* cited by examiner

MODULAR PROCESS CONTROL SYSTEM

TECHNICAL FIELD

The present disclosure relates generally to process plants and process control systems, and more particularly, to the use of containers and/or other techniques to achieve greater modularity and/or other benefits within a process control system.

BACKGROUND

Distributed process control systems, like those used in chemical, petroleum, industrial or other process plants to manufacture, refine, transform, generate, or produce physical materials or products, typically include one or more process controllers communicatively coupled to one or more field devices via analog, digital, or combined analog/digital buses, or via a wireless communication link or network. The field devices, which may be, for example, valves, valve positioners, switches, transmitters, sensors, etc., are located within the process control environment and generally perform physical or process control functions such as opening or closing valves, measuring process and/or environmental parameters (e.g., temperature or pressure), etc., to control one or more processes executing within the process plant or system. Smart field devices, such as field devices conforming to the well-known Fieldbus protocol, may also perform control calculations, alarming functions, and/or other control functions commonly implemented within the controller. The process controllers, which are also typically located within the plant environment, receive signals indicative of process measurements made by the field devices, and/or other information pertaining to the field devices, and execute a controller application that runs, for example, different control modules. The control modules make process control decisions, generate control signals based on the received information, and coordinate with the control modules or blocks being performed in the field devices, such as HART®, WirelessHART®, or Foundation® Fieldbus field devices. The control modules implemented in the controller send the control signals over communication lines or links to the field devices to thereby control the operation of at least a portion of the process plant or system, e.g., to control at least a portion of one or more industrial processes running or executing within the plant or system. I/O devices, which are also typically located within the plant environment, typically are disposed between a controller and one or more field devices to enable communications, e.g., by converting electrical signals into digital values and vice versa.

Information from the field devices and the controller is usually made available over a communication network to one or more other hardware devices, such as operator workstations, personal computers or computing devices, data historians, report generators, centralized databases, or other centralized administrative computing devices that are typically placed in control rooms or other locations away from the harsher field environment of the plant. These hardware devices run applications that may, for example, enable an operator to perform functions with respect to controlling a process and/or operating and monitoring the process plant (e.g., changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc.). The communication network utilized by the hardware devices, controllers, and field devices may include a wired communication path, a wireless communication path, or a combination of wired and wireless communication paths.

As an example, the DeltaV™ control system, sold by Emerson Automation Solutions, includes multiple applications stored within and executed by different devices located at diverse places within a process plant. A configuration application, which resides in one or more workstations or computing devices in a back-end environment of a process control system or plant, enables users to create or change process control modules and download these process control modules via a communication network to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto in order to implement actual process control functionality. The viewing applications, which may be executed on one or more operator workstations (or on one or more remote computing devices in communicative connection with the operator workstations and the communication network), receive data from the controller application via the communication network and display this data to process control system designers, operators, or other users using the user interfaces, and may provide any of a number of different views, such as an operator's view, an engineer's view, a technician's view, etc. A data historian application typically stores the current process control routine configuration and data associated therewith.

Generally, process control systems such as those discussed above are complex and include numerous software components. Over time, these software components tend to become highly interdependent, such that the components cannot be independently modified without consideration of a number of other software components. This difficulty is often compounded by efforts to ease development in the short-term, with efforts to address project management and delivery timeliness concerns introducing dependencies on other software components in the long-term. As a result, the deployment of new services within a conventional control system is not truly modularized. This can be especially problematic with the more recent move towards distributed control systems.

This difficulty of modifying existing software components also makes it more difficult to introduce new functionality within the control system, due to the likely existence of many "congealed" software components with which a new control system feature or function must interface. Typically, the developer must manually discover all necessary application programming interface (API) hooks, understand their interdependence upon each other, and develop the new control system feature/function as yet another set of congealed software components. This not only compounds the problem of future maintenance of software components, but also decreases the overall ability of the control system software to support newer technologies over time.

Some process control systems require custom calculations/algorithms that cannot be implemented within the control system platform. This is because the ability to run a control algorithm is determined by the supporting capabilities of the specific control system, as well as the situational configuration of the control strategy. Currently, developers rely on external interface protocols (e.g., Modbus, Modbus/TCP, EtherNet/IP, OPC, OPC-UA, IEC 61850, etc.) to manually tie in custom calculation engines that execute such control algorithms. However, this process of using a conventional external interface protocol to drive a control system with custom calculations is fraught with complexity and instability. While external interface protocols are designed for this purpose, the mechanism by which data is retrieved (e.g., network, inter-process communication (IPC), etc.) may be unreliable. Additionally, the platform that executes the custom calculation engine may have synchronization issues (e.g., sampling issues, aliasing, etc.) when the custom calculation engine processes data and makes data available, for both the ingress and egress data paths. Further, it is generally more difficult to validate external interfaces of this sort with agencies such as the FDA and EPA.

SUMMARY

Techniques, systems, apparatuses, components, devices, and methods are disclosed for increasing the modularity of a process control systems, and/or providing other benefits (e.g., increased design flexibility), thereby facilitating the development, modification, troubleshooting, and/or other aspects of such systems. Said techniques, systems, apparatuses, components, devices, and methods may apply to industrial process control systems, environments, and/or plants, which are interchangeably referred to herein as "industrial control," "process control," or "process" systems, environments, and/or plants. Typically, such systems and plants control, in a distributed manner, one or more processes that operate to manufacture, refine, transform, generate, or produce physical materials or products.

In one aspect of this disclosure, the process control system utilizes a "micro-service" architecture in which containerized control system services are modular and independently deployable. These control system services are supported by a control system service framework, and communicate across a service message bus. In some embodiments, the service message bus and service message protocol are independent of any underlying communication network protocol.

Each control system service is associated with its own interface, which defines how other control system services can interact with (e.g., send data to and receive data from) that control service. In some implementations, the interface of each control system service is independent of all other control system services, and each control system service does not require the presence of any other control system service to exist. The process control system may be decomposed into modular and independently deployable control system services according to business capability or sub-domains of like components, for example. As used herein, the term "control system service" may refer to a service that is integral to the control of a physical process (e.g., a control logic service or control execution service), or a service that is associated with the physical process in some other manner (e.g., a diagnostic service, a data historian service, an operator console service, etc.). Each control system service may be deployed at "runtime" to fit the needs of a customer site, and customization of a particular process control system may be achieved by modifying the combination of control system services deployed on that process control system.

In some implementations, each control system service is instantiated within a container, which may be any independent and self-deployable computational vessel (e.g., an instance of a Docker or LXD image, a virtual machine, etc.). Each container is stand-alone, and can execute by itself or in conjunction with other stand-alone containers. A single hardware device may host only a single service (i.e., implement/store a single service container), or may host multiple service containers, depending on the embodiment. Data flow through a given service container is defined by the message protocol and service message bus applied within the process control system.

The control system services may share and maintain a standard mechanism that defines and supports common functions applicable to all control system service instances (i.e., "cross-cutting concerns"). This framework may provide capabilities to develop, test, debug and deploy control services in a generic manner, for example, and may be malleable to facilitate the implementation of different and newer control system services.

In some embodiments, each control system service maintains a dedicated database of information specific to that service. In addition, or alternatively, one or more of the control system services may provide other control system services with access to a central database.

To facilitate the delivery of service messages between multiple services (i.e., "service endpoints"), the process control system may include a service message router that is responsible for forwarding the message traffic on the service message bus. The service message router may also connect to service message routers of other process control systems, to connect and forward communications between process control systems on a first-class basis, such that communications between process control systems can be consumed with the same importance/priority/etc. as first-class communications that originate and are consumed within a single process control system. "First-class" communications, and quality of service in general, are discussed in further detail below with reference to FIG. 2. The service message router may also allow for the delivery of messages to newly discovered control system services. Discovery of control system services may be centralized or de-centralized, depending on the implementation.

To prevent bad actors from interfacing with the process control system via the service message bus, service endpoints and messages intended for the service message bus may be scrutinized for authentication, authorization, privilege level and correctness, and users of the system may be logged for all major actions taken. To further enhance security, message traffic may be encrypted by the service endpoints originating the messages.

In some implementations, one control system service can encapsulate one or more other control system services, with the encapsulated service(s) maintaining the ability to communicate on a first-class basis with other control system services within the process control system.

By utilizing a modular, micro-service control architecture, development, modification, expansion, debugging, etc., of the process control system may be greatly simplified. For example, a developer can introduce a new control system service, or update or troubleshoot an existing service, without having to manually discover various API hooks and their interdependencies. This in turn makes it far more feasible for third parties to develop their own control system services, which may facilitate a robust marketplace of services.

Moreover, the use of containerized services can greatly reduce the effect of certain hardware limitations. For example, for load balancing or other reasons, a control system service may migrate from one hosting device (e.g., server, field device, etc.) to another hosting device within the process control system. The accomplish this, the new hosting device may create an instance/container of the migrating control system service, and the original service instance/container may transfer all state and runtime data to the new service instance/container. The service message bus may allow for control system services to communicate regardless of physical location or type of service host.

As another example, to maintain redundancy of control system services, active and backup devices may run redundant instances of a single control system service. The redundancy scheme may be a hot-standby approach or a dual-drive mechanism, for example. Redundancy may be applied to any control system service, and to any service host device without regard to the function of the host device within the process control system. For example, a data historian service could be hosted by a dedicated historian server, a gateway device, or even a valve field device, etc.

In some embodiments, N (>1) instances or copies of a particular service are hosted by N respective hardware servers (and/or other physical devices), with the servers or other devices handling message traffic by implementing their respective service instances/copies in parallel, in a load-balanced manner. In addition to providing the bandwidth-related benefits of load-balancing, fault tolerance is improved. For example, if one server fails, N−1 other copies of the service remain and can still be utilized. In other embodiments, just one service instance handles message traffic, and other copies of the service are not utilized until a particular event (e.g., device failure) "activates" one of the other copies, similar to the hot-standby approach noted above.

In another aspect of this disclosure, a process control system integrates a custom calculation engine, which runs a control algorithm external to the process control system. As used herein, the term "custom" may broadly refer to anything that is not native to the process control system, or not native to a specific portion of the process control system. A custom control algorithm may be an algorithm that the process control system is unable to implement itself, for example. In this aspect, the process control system generally controls a physical process by utilizing function blocks, with each function block representing a specific control algorithm, and with each function block having configurable inputs and outputs. The execution order is dictated by connections between inputs and outputs of the various function blocks. The function blocks may be blocks of a function block diagram according to the IEC 61131-3 specification, for example.

To incorporate the external custom calculation engine, the process control system includes a "shadow" function block (also referred to herein as a "shadow block"), which provides an interface to the custom calculation engine. In this manner, in some embodiments, the control algorithm of the external engine impacts the process control system in a first-class manner, i.e., similar to any other function block defined within the function block diagram. In some embodiments, the custom calculation engine is containerized (e.g., an instance of a Docker or LXD image, etc.), in which case the shadow block transfers its own input(s) to the container, and receives output(s) from the container to use as its own output(s). In some embodiments, the containerization provides isolation of the custom calculation engine from any other software entity except for the interface with the shadow block (e.g., via an API of the custom calculation engine container).

Moreover, by using a shadow block interface, the custom calculation engine can be represented, instantiated, and executed in a function block diagram (e.g., as defined in IEC 61131-3). This allows control system engineering personnel to interact with the custom calculation engine without any formal or specialized training when configuring or monitoring the system. For example, process alarming, historian interaction, data acquisition, etc., may occur without the need for a specialized custom interface. Further, because the shadow block forces the custom calculation engine to, in effect, execute synchronously through the shadow block interface, the function block diagram executes in a more deterministic and predictable manner. This avoids, or at least reduces the likelihood of, problems arising from asynchronous execution of the custom calculation engine, such as sampling rate issues, aliasing, system noise, etc., and facilitates enforcement of a desired execution order.

DETAILED DESCRIPTION

Figure 1:
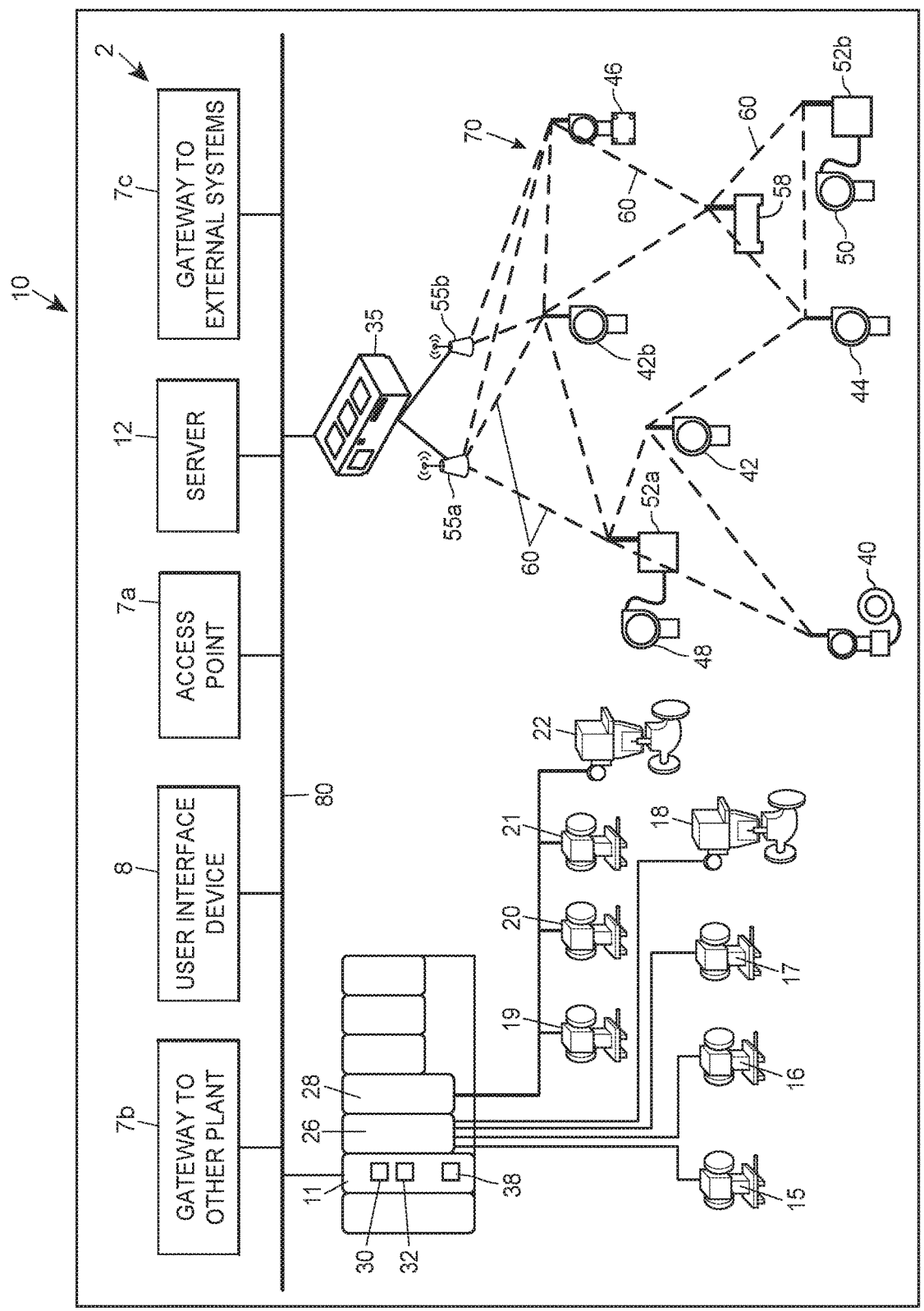
FIG. 1 is a block diagram of an example process plant or process control system.

FIG. 1 is a block diagram of an example process control system 10 that may utilize any one or more of the novel techniques described herein. Generally, the process control system 10 processes signals indicative of process measurements made by field devices to implement a control routine, and to generate control signals that are sent over wired or wireless process control communication links or networks to other field devices to control the operation of a physical process in the process control system 10. Typically, at least one field device performs a physical function (e.g., opening or closing a valve, increasing or decreasing a temperature, taking a measurement, sensing a condition, etc.) to control the physical process. Some types of field devices communicate with other devices (e.g., controllers) using I/O devices.

In the example of FIG. 1, a process controller 11 is communicatively connected to wired field devices 15-22 via input/output (I/O) cards 26 and 28, and is communicatively connected to wireless field devices 40-46 via a wireless gateway 35 and a communication network 80. In some of the "micro-service" architecture embodiments described herein, however, the process control system 10 need not include any dedicated process controller devices. For example, as will be discussed in further detail below, the control functions (e.g., control logic/execution) of process controller 11 may be implemented purely as services that are partly or wholly distributed among (hosted by) other physical devices that have other dedicated functions (e.g., field devices, operator workstations, etc.).

Regardless of whether the process control system 10 includes the controller 11, the communication network 80 may include one or more wired and/or wireless communication links, and may be implemented using any desired or suitable or communication protocol or protocols, such as, for example, an Ethernet protocol. In some configurations (not shown) that include the controller 11, the controller 11 may be communicatively connected to the wireless gateway 35 using one or more communications networks other than the network 80, such as by using any number of other wired or wireless communication links that support one or more communication protocols, e.g., a Wi-Fi or other IEEE 802.11 compliant wireless local area network (WLAN) protocol, a mobile communication protocol (e.g., WiMAX, LTE, or other ITU-R compatible protocol), Bluetooth®, HART®, WirelessHART®, Profibus, Foundation® Fieldbus, etc.

One or more devices of the process control system 10 (possibly including the controller 11) host control system services to implement a batch process or a continuous process using at least some of the field devices 15-22 and 40-46. Example control system services are discussed below in connection with FIGS. 2 through 6. In an embodiment, in addition to being communicatively connected to the network 80, the controller 11 is also communicatively connected to at least some of the field devices 15-22 and 40-46 using any desired hardware and software associated with, for example, standard 4-20 mA devices, I/O cards 26, 28, and/or any smart communication protocol such as the Foundation® Fieldbus protocol, the HART® protocol, the WirelessHART® protocol, etc. In the example of FIG. 1, the controller 11, the field devices 15-22, and the I/O cards 26, 28 are wired devices, and the field devices 40-46 are wireless field devices. Of course, the wired field devices 15-22 and wireless field devices 40-46 could conform to any other desired standard(s) or protocols, such as any wired or wireless protocols, including any standards or protocols developed in the future.

The process controller 11 in the example of FIG. 1 includes a processor 30 and a memory 32. The processor 30 is configured to communicate with the field devices 15-22 and 40-46 and with other nodes communicatively connected to the controller 11. The memory 32 (e.g., random access memory (RAM) and/or read only memory (ROM)) may store computing vessels (e.g., containers) that are executed by the processor 30 to provide certain control system services, as discussed further below. While not shown in FIG. 1, any one or more of the other devices shown in FIG. 1 (e.g., field devices 15-22 or 40-46, wireless gateway 35, or any of devices 7a, 7b, 7c, 8 or 12 discussed below) may also include memory and processors that enable those devices to similarly host one or more control system services.

In some embodiments, the process control system 10 (i.e., controller 11 and/or other devices) implements a control strategy using what are commonly referred to as function blocks, where each function block operates in conjunction with other function blocks (via communications called links) to implement process control loops within the process control system 10. Control-based function blocks typically perform one of an input function (e.g., associated with a transmitter, a sensor, or some other process parameter measurement device), a control function (e.g., associated with a control routine that performs PID, fuzzy logic, etc. control), or an output function that controls the operation of some device (e.g., a valve or pump) to perform some physical function within the process control system 10. Of course, hybrid and other types of function blocks exist. Function blocks may be stored in and executed by the controller 11 (which is typically the case when these function blocks are used for, or are associated with standard 4-20 mA devices and some types of smart field devices such as HART® devices), stored in and implemented by the field devices themselves (which can be the case with Foundation® Fieldbus devices), and/or stored in an implemented by other devices of the process control system 10. Function blocks are discussed further below in connection with the aspect of the invention discussed at FIGS. 8 through 10 and 12.

The wired field devices 15-22 may be any types of devices, such as sensors, valves, transmitters, positioners, etc., while the I/O cards 26 and 28 may be any types of I/O devices conforming to any desired communication or controller protocol. In FIG. 1, the field devices 15-18 are standard 4-20 mA devices or HART® devices that communicate over analog lines or combined analog and digital lines to the I/O card 26, while the field devices 19-22 are smart devices, such as Foundation® Fieldbus field devices, that communicate over a digital bus to the I/O card 28 using a Foundation® Fieldbus communications protocol. In some embodiments, though, at least some of the wired field devices 15, 16 and 18-21 and/or at least one of the I/O cards 26, 28 additionally or alternatively communicate with the controller 11 using the network 80 and/or other suitable control system networks and protocols (e.g., Profibus, DeviceNet, Foundation® Fieldbus, ControlNet, Modbus, HART®, etc.).

In FIG. 1, the wireless field devices 40-46 communicate via a wireless process control communication network 70 using a wireless protocol, such as the WirelessHART® protocol. Such wireless field devices 40-46 may directly communicate with one or more other devices or nodes of the wireless network 70 that are also configured to communicate wirelessly (using the wireless protocol or another wireless protocol, for example). To communicate with one or more other nodes that are not configured to communicate wirelessly, the wireless field devices 40-46 may utilize the wireless gateway 35, which is connected to the network 80 or to another process control communications network. The wireless gateway 35 provides access to various wireless devices 40-58 of the wireless communications network 70. In particular, the wireless gateway 35 provides communicative coupling between the wireless devices 40-58, the wired devices 15-28, and/or other nodes or devices of the process control system 10. For example, the wireless gateway 35 may provide communicative coupling by using the network 80 and/or one or more other communications networks of the process control system 10.

Similar to the wired field devices 15-22, the wireless field devices 40-46 of the wireless network 70 perform physical control functions within the process control system 10, e.g., opening or closing valves, or taking measurements of process parameters. The wireless field devices 40-46, however, are configured to communicate using the wireless protocol of the network 70. As such, the wireless field devices 40-46, the wireless gateway 35, and other wireless nodes 52-58 of the wireless network 70 are producers and consumers of wireless communication packets.

In some configurations of the process control system 10, the wireless network 70 also includes non-wireless devices. For example, in FIG. 1, a field device 48 of FIG. 1 is a legacy 4-20 mA device and a field device 50 is a wired HART® device. To communicate within the network 70, the field devices 48 and 50 are connected to the wireless communications network 70 via a wireless adaptor 52A, 52B. The wireless adaptors 52A, 52B support a wireless protocol, such as WirelessHART®, and may also support one or more other communication protocols such as Foundation® Fieldbus, Profibus, DeviceNet, etc. Additionally, in some configurations, the wireless network 70 includes one or more network access points 55A, 55B, which may be separate physical devices in wired communication with the wireless gateway 35, or may be provided with the wireless gateway 35 as an integral device. The wireless network 70 may also include one or more routers 58 to forward packets from one wireless device to another wireless device within the wireless communications network 70. In FIG. 1, the wireless devices 40-46 and 52-58 communicate with each other and with the wireless gateway 35 over wireless links 60 of the wireless communications network 70, and/or via the network 80.

In FIG. 1, the process control system 10 includes one or more operator workstations or user interface devices 8 that are communicatively connected to the network 80. Via the operator workstations 8, operators may view and monitor runtime operations of the process control system 10, as well as take any diagnostic, corrective, maintenance, and/or other actions that may be required. At least some of the operator workstations 8 may be located at various, protected areas in or near the process control system 10, and in some situations, at least some of the operator workstations 8 may be remotely located, but nonetheless in communicative connection with the process control system 10. Operator workstations 8 may be wired or wireless computing devices.

In some configurations, the process control system 10 includes one or more other wireless access points 7a that communicate with other devices using other wireless protocols, such as Wi-Fi or other IEEE 802.11 compliant WLAN protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near-field communications (NFC) and Bluetooth® protocols, or other suitable wireless communication protocols. Typically, the wireless access point(s) 7a allow handheld or other portable computing devices to communicate over a respective wireless process control communication network that is different from the wireless network 70 and supports a different wireless protocol than the wireless network 70. For example, a wireless or portable user interface device 8 may be a mobile workstation or diagnostic test equipment that is utilized by an operator within the process control system 10. In some scenarios, in addition to portable computing devices, one or more process control devices (e.g., controller 11, one or more of field devices 15-22, and/or one or more of wireless devices 35, 40-58) also communicate using the wireless protocol supported by the access point(s) 7a.

In some configurations, the process control system 10 includes one or more gateways 7b, 7c to systems that are external to the process control system 10 (also referred to herein as "edge gateways"). Typically, such systems are associated with customers or suppliers of information generated or operated on by the process control system 10. For example, the process control system 10 may include a gateway node 7b to communicatively connect a process plant containing the process control system 10 with another process plant. Additionally or alternatively, the process control system 10 may include a gateway node 7c to communicatively connect the process control system 10 with an external public or private system, such as another provider's process control system, a third party provider of custom calculation engines (e.g., as discussed in further detail below), a laboratory system (e.g., Laboratory Information Management System or LIMS), an operator rounds database, a materials handling system, a maintenance management system, a product inventory control system, a production scheduling system, a weather data system, a shipping and handling system, a packaging system, the Internet, and/or other external systems.

It is noted that although FIG. 1 illustrates a specific arrangement of a specific number of devices (of specific types), this is only an illustrative and non-limiting embodiment. For example, the process control system 10 may omit the controller 11 as noted above, or may include multiple controllers similar to controller 11. As another example, the process control system 10 may include any number of wired and/or wireless field devices similar to field devices 15-22 and/or 40-50, any number of other devices (e.g., devices 7a, 7b, 7c, 8, 12, 52a, 52b, 55a, 55b, etc.), and so on.

Further, it is noted that the process control system 10 of FIG. 1 may include a field environment (e.g., "the process plant floor") and a back-end environment (e.g., including server 12) which are communicatively connected by the communication network 80. As shown in FIG. 1, the field environment includes physical components (e.g., process control devices, networks, network elements, etc.) that are disposed, installed, and interconnected therein to operate to control the process during runtime. For example, the controller 11, the I/O cards 26, 28, the field devices 15-22, and other devices and network components 35, 40-50, 52, 55, 58 and 70 are located, disposed, or otherwise included in the field environment of a plant containing the process control system 10. Generally speaking, in the field environment of the process control system 10, raw materials may be received and processed using the physical components disposed therein to generate one or more products.

The back-end environment of the process plant including the process control system 10 includes various components that are shielded and/or protected from the harsh conditions and materials of the field environment. For example, the back-end environment may include the operator workstation 8, the server 12, and/or functionality that support the runtime operations of the process control system 10. In some configurations, various computing devices, databases, and other components and equipment included in the back-end environment of the plant containing the process control system 10 may be physically located at different physical locations, some of which may be local to the process plant and some of which may be remote.

Figure 2:
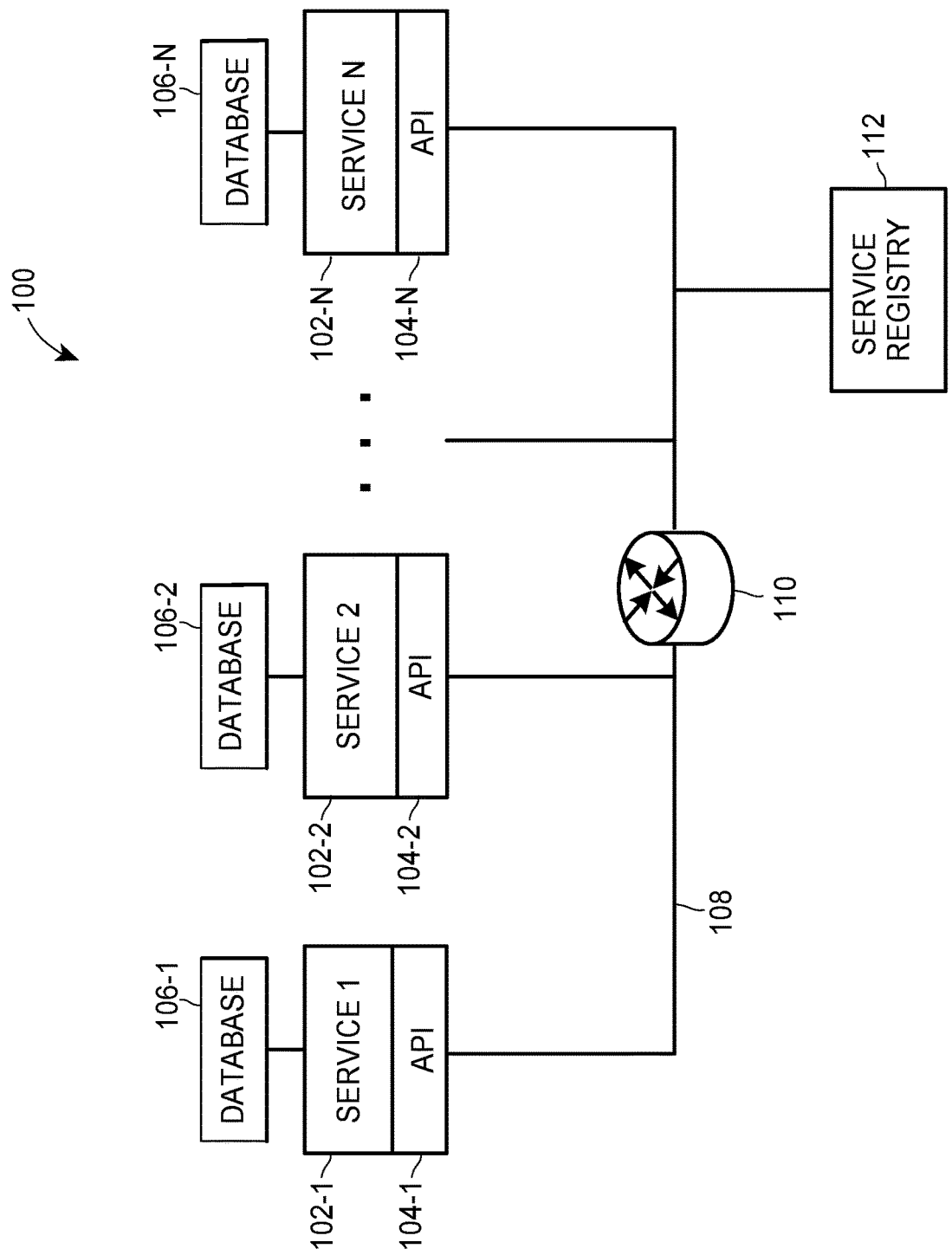
FIG. 2 is a block diagram of an example micro-service control architecture of a process control system.

FIG. 2 is a block diagram of an example micro-service control architecture 100 that can be implemented in a process control system, such as the process control system 10 of FIG. 1, for example. While the micro-service control architecture 100 is described below with reference to devices/components of the process control system 100, it is understood that other systems and/or devices may instead implement the architecture 100.

The example micro-service control architecture 100 includes a plurality of control system services 102-1 through 102-N, where N may be any suitable integer (e.g., in the ones, tens, hundreds, etc.). Each of the control system services 102-1 through 102-N is associated with a respective one of N service interfaces 104-1 through 104-N and a respective one of N service databases 106-1 through 106-N. For simplicity of notation, control system services 102-1 through 102-N, service interfaces 104-1 through 104-N, and service databases 106-1 through 106-N may generally be referred to herein as services 102, service interfaces 104, and service databases 106, respectively.

Services 102 may include any types of services associated with a process control system. For example, services 102 may include a number of services that are integral to the control of a physical process. As one example, service 102-1 and 102-2 may be control logic services, and service 102-3 (not shown in FIG. 2) may be a control execution service that, when invoked or called, dictates the order of execution of the control logic of services 102-1, 102-2, and possibly other control logic services. As another example, services 102 may include a control configuration service and a control communication service. Services 102 may also, or instead, include a number of services that are associated with the physical process in some other manner, such as monitoring services, diagnostic services, analytics services, and so on. For example, services 102 may include an operator console service, an alarm management service, an event management service, a diagnostic service, a remote access service, an edge gateway service, an input/output service, a data historian service, an external and/or peripheral input/output translation service, a key performance indication service, a data monitoring service, a message pass-through service, a safety logic service, and/or any other suitable type of service related to control systems. Some or all of the services 102 may be deployed at runtime to fit the needs of a customer site, and customization of a particular process control system (e.g., system 10) may be achieved relatively easily by modifying the combination of services 102 deployed on that process control system.

In some embodiments, one or more of the services 102 are machine learning or artificial intelligence (AI) services. For example, the services 102 may include an analytics service that predicts future performance and/or problems associated with the control system, and/or a service that predicts/estimates parameters that cannot be directly measured within the control system (e.g., to provide "soft sensing" of physical parameters), and so on. For example, one or more of the services 102 may employ a machine learning model, such as a neural network, that is trained according to a supervised or unsupervised learning technique. In some embodiments, a machine learning or AI service 102 may provide an interface 104 that enables the service 102 to obtain training data, for creating and/or updating (tuning) the model implemented by that service 102.

Each of the services 102 is "containerized," i.e., instantiated within a container. As used herein, the term "container" refers to any independent and self-deployable computational vessel, such as an instance of a Docker or LXD image, a Windows container, a BSD jail, a chroot jail, a process, a thread of execution, or a virtual machine (e.g., virtual controller), for example, where each container is stand-alone and can execute by itself or in conjunction with other stand-alone containers.

The containerized services 102 are modular and independently deployable, and can communicate with each other across a service message bus 108. As used herein, the term "service message bus" may refer to a computer network, and/or other communication means such as direct API libraries, inter-process communication, intra-process communication, remote procedure call, shared memory, etc., and may include or be layered upon wired and/or wireless (e.g., radio frequency) networks. The service message bus 108 may, in some embodiments, be independent of any underlying communication network protocol(s). With reference to the process control system 10 of FIG. 1, for example, the service message bus 108 may operate on top of the communication network 70 and/or network 80, independently of any protocols associated with those networks (e.g., IEEE 802.11 compliant WLAN, WiMAX, LTE, Bluetooth®, HART®, WirelessHART®, Profibus, Foundation® Fieldbus, etc.) as discussed above.

The service message bus 108 and service message router 110 may support different quality of service (QoS) levels for different communications. For example, critical service messages (e.g., messages used to control the physical process in real time), and certain other service messages, may be "first-class" messages that are handled differently than other (e.g., second-class, third-class, etc.) service messages that are less time-sensitive. As one example, if the communication bandwidth of the service message bus 108 (e.g., as dictated by the bandwidth of an underlying network such as network 70 or 80) is fully utilized, the service message router 110 may decide which messages to send, or decide which messages to send first, based on a priority corresponding to the QoS level of each message. The router 110 may delay or even drop certain message types, such as historian service messages or diagnostic service messages, if higher-priority service messages must be sent within the limited available bandwidth, for example. Services 102 attempting to send lower-priority messages may compensate for this degraded behavior through the use of reliable messaging techniques, such as message retransmission, skipping stale messages, or lowering the transmission rate of messages to the communication endpoint service 102, for example.

Each service 102 may be hosted by any of a number of different physical devices (e.g., any device having sufficient processor, memory and communication capabilities). A device may "host" a service, for example, by storing in memory all code, and all dependencies, needed to support the service, and executing stored instructions as needed to implement the service and any related functions (e.g., discovery-related functions, as discussed below). In some embodiments, for example, a device hosts a service 102 by storing an instance of an image (e.g., a Docker or LXD image) corresponding to that service. Each physical device that hosts one or more services may implement a "service host" entity, which represents the physical device to the rest of the process control system, and manages redundancy lifecycle of the service(s) hosted by the physical device (e.g., manages state transfer for redundancy switchovers and/or consideration concerning service migration, as discussed in further detail below).

Referring to the process control system 10 of FIG. 1, the controller 11 may host all of the services 102, and/or other devices in the system 10 may host some or all of the services 102. As just one example, the controller 11 may host control logic and execution services of services 102, the operator workstation 8 may host an operator console service of the services 102, the server 12 may host a control configuration service of the services 102, and so on. As another example, different ones of the field devices 15-22 and/or 40-50, and/or other devices in the system 10, may host all control logic and execution services of services 102, and the system 10 may omit the controller 11 entirely.

Each of the service interfaces 104 may be an API, with the service interface 104 defining how other services 102 can interact with (e.g., send messages to and receive messages from) the corresponding service 102. For example, the service interface 104-1 may comprise an API that enables some or all of the services 104-2 through 104-N to exchange messages with the service 104-1. Each API of the interfaces 104 may be associated with a particular syntax and list of parameters specific to the corresponding service 102, for example. In some embodiments, the interface 104 of each service 102 is independent of all other services 102, and each service 102 does not require the presence of any other service 102 to exist. Data flow through the container of a given service 102, via the respective interface 104, is defined by the message protocol of the service message bus 108. Messages communicated via the service message bus 108 may be data or management messages (e.g., heartbeat messages), for example.

Each of the service databases 106 is a dedicated database storing information specific to the corresponding one of the services 102, and can be any suitable type of data storage mechanism using any suitable type of data structure (e.g., a raw data file, a relational database, a transactional database, a textual database file, a structured text mechanism, etc.). In other embodiments, one or more of the services 102 may not include a respective, dedicated database 106. In some embodiments, for example, at least one of the services 102 provides a centralized database service that is available to some or all other services 102 (e.g., a central database that replaces or supplements one or more of the dedicated databases 106).

The services 102 may share and maintain a standard mechanism that defines and supports common functions applicable to all control system service instances (i.e., "cross-cutting concerns"). This framework can provide capabilities to develop, test, debug and deploy control services in a generic manner, for example, and may be malleable to facilitate the implementation of different and newer control system services.

To facilitate the delivery of service messages between multiple services 102 via the service message bus 108, the architecture 100 may include a service message router 110 that is responsible for forwarding the message traffic on the service message bus 108. The service message router 110 may be a physical component/device of the control system, or a software component. The service message router 110 facilitates fan-out and fan-in messaging such that one of the services 102 can request the service message router 110 to transmit a message to one or multiple other services 102. Moreover, in some embodiments, the service message router 110 can bundle together messages from multiple services 102 (e.g., services 102-1 and 102-2), and then send the bundled messages to a single other service 102 (e.g., to a service 102-3, not shown in FIG. 2).

While shown in FIG. 2 (and some subsequent figures) as an intermediary point/connection between two distinct portions of the service message bus 108, the service message router 110 and the service message bus 108 may be arranged according to any suitable network configuration. In various embodiments, for example, the service message router 110 may be arranged as an additional parallel node on the service message bus 108 (e.g., similar to each of the services 102), the service message router 110 and the services 102 may be arranged as a mesh network, all services 102 may be communicatively coupled to the service message router 110 in a star network configuration, and so on. However, the service message bus 108 may be agnostic to the network topology (star, mesh, etc.) of any underlying communication network(s). The service message router 110 may use any suitable routing technique that is appropriate to the network configuration being used (e.g., flooding, multiplexing, etc.).

Referring to the process control system 10 of FIG. 1, the service message router 110 may be implemented by any device, such as the controller 11, the wireless gateway 35, or the server 12, for example. In some embodiments, functionality of the service message router 110 is distributed among two or more physical devices (e.g., controller 11 and wireless gateway 35). In some embodiments, the service message router 110 may also connect to other, similar service message routers (e.g., via the gateway 7c) to allow for the delivery of messages to and from other control system services (similar to services 102) hosted by another process control system. In this manner, the service message router 110 may connect and forward communications between different process control systems on a first-class basis, such that communications between the process control systems can be consumed with the same importance/priority/etc. as first-class communications that originate and are consumed within a single process control system). One example of control system interconnectivity is discussed below with reference to FIG. 5. In some embodiments (e.g., embodiments that access cloud-based services), the use of external services is restricted to services associated with less stringent timing requirements, such as a data analytics service, for example.

In some embodiments and/or scenarios, third parties may develop services for implementation in the process control system. For example, a computing device of the process control system 10 (e.g., server 12) may obtain (e.g., upload or download) an image corresponding to a particular service (e.g., a control logic service) from a third party via gateway 7c and an Internet link. That computing device, or another device of the process control system 10 (e.g., the controller 11) may then create an instance of the image in order to host the service.

In some embodiments, the micro-service control architecture 100 implements an automated discovery technique to support initialization, modification and/or expansion of the set of services 102. Discovery of the services 102 may be centralized or de-centralized, depending on the embodiment. FIG. 2 represents an embodiment in which the architecture 100 utilizes a centralized mechanism for service discovery. To this end, the architecture 100 includes a service registry 112 that maintains a registry of control system services. The service registry 112 may be implemented/maintained by any physical device in the process control system (e.g., the controller 11, gateway 35, one of field devices 15-22 or 40-50, etc., in the process control system 10). The service registry 112 monitors (and in some embodiments, controls)

the presence or absence of each service 102, and notifies each service 102 of any other services 102 that are newly installed. Alternatively, each existing service 102 may query the service registry 112 (e.g., on a periodic basis) to learn the current complete set, or a particular sub-set, of the services 102.

In alternative embodiments, the process control system employs a decentralized mechanism for the discovery of control services. In one such embodiment, each newly added service 102 broadcasts/announces its availability to all other existing services 102 on the service message bus 108 (e.g., via the service message router 110). In this embodiment, the existing services 102 are responsible for maintaining a record of the new service 102 and its connectivity and serviceability.

In some embodiments where multiple service message routers communicate on the same interconnecting network (e.g., as in the example embodiment of FIG. 4 discussed below), those routers can automatically discover each other and all services connected to the service message routers. For example, each service message router may be responsible for sending a complete list of available services 102 known to that router (e.g., as obtained from a service registry such as service registry 112) to any other discovered service message routers.

In some embodiments, a process control system (e.g., system 10) can relocate various services 102 from one hosting device to another hosting device within the process control system. This service "migration" may be performed for load balancing purposes, for example. Conceptually, this may be viewed as a single service 102 (e.g., service 102-1) moving to a new hosting device, or as the removal of a first service 102 from the process control system and the addition of a second, identical service 102.

In one such embodiment, the migrating service 102, while still hosted by the original device, notifies the service message router 110 that the migrating service 102 intends to leave its current hosting device in favor of another, "target" hosting device. The service message router 110 may then notify a service host entity of the target hosting device of the migration attempt. In response, the target hosting device creates an instance/container of the migrating service 102, and the service 102 transfers all state and runtime data from the original hosting device to the new instantiation of the service 102 at the target hosting device. Once this transfer is complete, the service message router 110 reroutes all messages to the new instance, and notifies the service host entity of the original hosting device it may terminate the original service 102. Notably, the services 102 are not necessarily unique to a particular type of physical device. For example, it is possible for a particular service 102 to move from a physical control device (e.g., one of field devices 15-22 or 40-50) to a workstation (e.g., user interface device 8) or an edge gateway device (e.g., gateway 7b or 7c), etc. The service message bus 108 allows for the services 102 to communicate irrespective of physical location or type of host device.

For purposes of maintaining redundancy of certain services 102, different physical devices may run redundant versions of the same service 102. The redundancy scheme may be a hot-standby approach (e.g., wherein a first physical device is actively providing the service 102-1, and a second physical device can provide the service 102-1 as a backup, with no or minimal loss of data, if the first physical device fails), or a dual-drive mechanism (e.g., wherein a first and second physical device simultaneously provide the service 102-1), depending on the embodiment and/or user configuration. In some cases (e.g., for a data historian service), a greater amount of delay (e.g., a few cycles) is acceptable when switching to a backup service/host. Generally, a 1:N redundancy of physical devices providing the same service 102 is possible. Redundancy may be applied to any service 102 and to any type of host device without regard to the function of the service 102 or device within the process control system. In some embodiments, redundant history services, redundant operator panels, and redundant control devices exist within the same process control system. The service host entity within each hosting device may negotiate and transfer the redundancy state for each service 102. One example of a process control system with redundant services is discussed below with reference to FIG. 4.

The micro-service control architecture 100, in some embodiments, provides additional design flexibility by enabling a first service 102 (e.g., service 102-1) to encapsulate one or more other services 102 of the process control system (e.g., services 102-2, 102-3, etc.). For example, decomposition of the services 102, and/or business needs, may necessitate such encapsulation. The encapsulating service 102 may be responsible for providing for the routing of service messages to and from the encapsulated service(s) 102. In one such embodiment, this is done by creating an instance of a service message router (e.g., router 112) within the encapsulating service 102. There is no logical limit to the amount of potential recursion allowed for encapsulated services 102. In some embodiments, encapsulated services 102 communicate on a first-class basis with other services 102 within the process control system (i.e., other services 102 that are not encapsulated, or are not encapsulated within the same encapsulating service 102). One example of a process control system with encapsulated services is discussed below with reference to FIG. 6.

The micro-service control architecture 100 may also provide various security features. For example, one or more entities (e.g., a security service of the services 102, and/or the service message router 110, etc.), may scrutinize service endpoints, and service messages intended for the service message bus 108, for authentication, authorization, privilege level, and/or correctness, to prevent "bad actors" from interfacing with the process control system through the service message bus 108. Moreover, in some embodiments, an entity (e.g., a security service of the services 102) may log all users of the process control system for all actions (or all major actions, etc.) taken by those users. Further still, services 102 may encrypt messages prior to transmission on the service message bus 108.

With the micro-service control architecture 100 discussed above, control system services such as the services 102 may be deployed as self-contained, stand-alone services. Each service 102 is equipped with the knowledge to communicate with other services 102 to achieve associated control and/or business goals. Future modifications to a given service 102 may be confined within the responsibilities of that service 102, and do not impact the concerns of other unrelated services 102. Dependency concerns of the services 102 upon each other are marginalized to the service interfaces 104 used between the communicating services 102. For example, dependencies of the service 102-1 upon the service 102-2 (and vice versa) are marginalized to the interfaces 104-1 and 104-2.

Various examples of the services 102, and of communications between those services 102, will now be discussed with reference to FIGS. 3 through 6. In classical control engineering, input I/O control data is processed through a control algorithm, which then drives a corresponding output.

As seen in the following examples, this can be achieved using communications between control system services (e.g., services 102), within a single process control system or across multiple process control systems.

Figure 3:
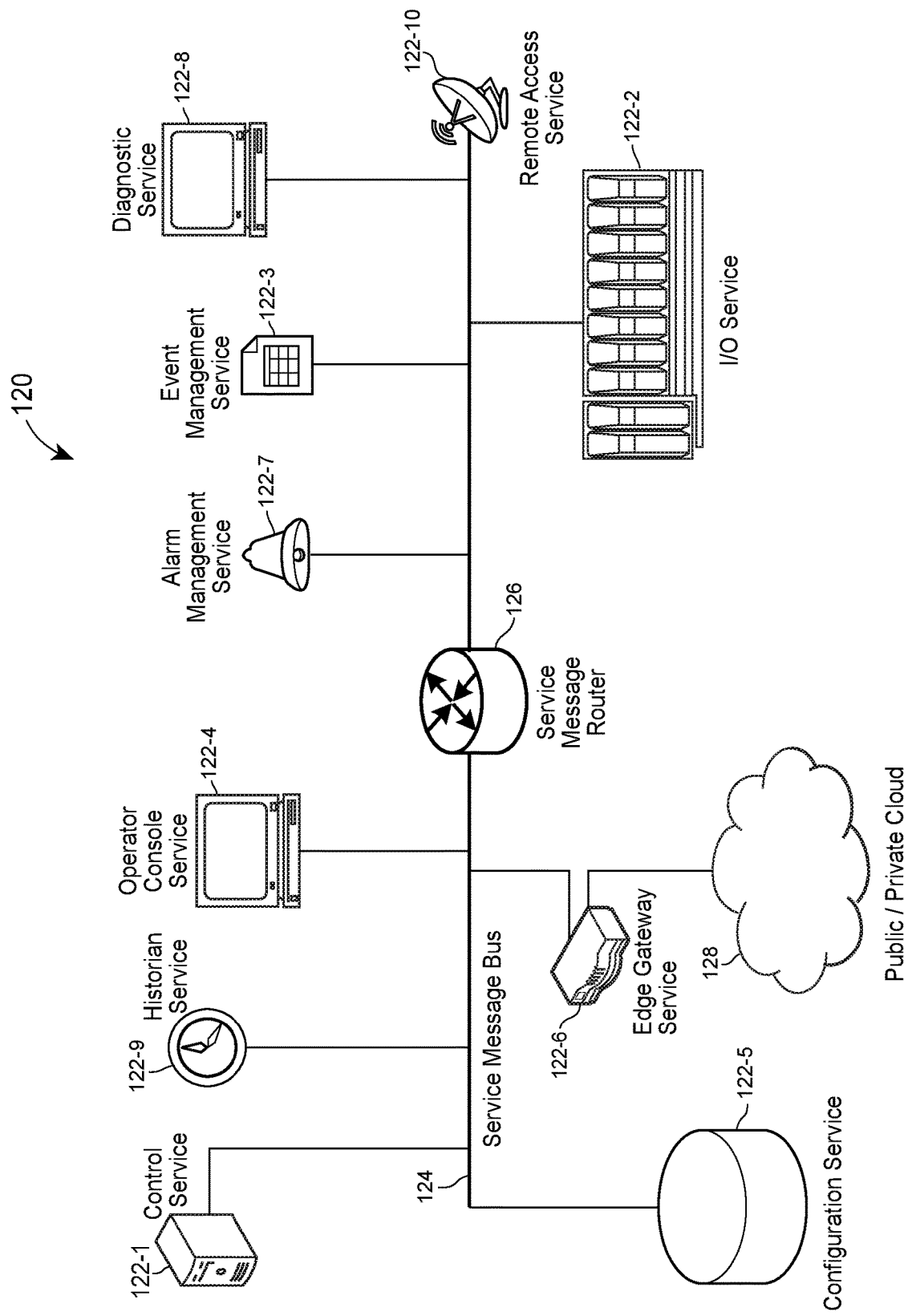
FIG. 3 is a block diagram of a first example implementation of the micro-service control architecture of FIG. 2.

Referring first to FIG. 3, an example micro-service control architecture 120 includes a control service 122-1, an I/O service 122-2, an event management service 122-3, an operator console service 122-4, a configuration service 122-5, an edge gateway service 122-6, an alarm management service 122-7, a diagnostic service 122-8, a remote access service 122-9, and a historian service 122-10. The services 122-1 through 122-10 may be different ones of the services 102 (i.e., containerized services as discussed above), and are coupled to a service message bus 124 (e.g., similar to bus 108) and a service message router 126 (e.g., similar to router 110). While not shown in FIG. 3, the micro-service control architecture 120 may include a service registry similar to the service registry 112.

The control service 122-1 may implement classic proportional-integral-derivative (PID) control of a physical process, for example, and the I/O service 122-2 may be used to "read" data from a physical device (e.g., sensor) or "write" data to a physical device (e.g., drive a valve, or pump, etc.). The event management service 122-3 may log and/or handle responses to various pre-defined "events" that occur within the process control system. The operator console service 122-4 may provide and/or populate a GUI (e.g., on a display of the user interface device 8) that an operator may use for configuration, runtime monitoring, diagnosis, etc., of the process control system, and interact with other services to present information on the GUI and/or forward inputs that the operator enters via the GUI. The configuration service 122-5 may (e.g., in response to user inputs via the operator console service 122-4) enable users to create or change process control algorithms (e.g., add or remove various control services), create or change operator interfaces, modify set points within the process control system, and/or perform other configuration operations.

The edge gateway service 122-6 may provide a secure link to external devices and/or systems via a public or private cloud network 128. The alarm management service 122-7 may monitor various parameters in the process control system (e.g., sensed temperatures and/or pressures, etc.) and utilize algorithms and/or thresholds to determine when one or more alarms should be triggered. The diagnostic service 122-8 may collect information from various devices and/or other services for diagnostic purposes (e.g., generate and/or collect diagnostic codes). The historian service 122-9 may store the current process control routine configuration, and data associated therewith. The remote access service 122-10 may forward communications to and from one or more other devices and/or systems via a wireless (e.g., radio frequency) link/network. Thus, for example, the process control system may call/utilize containerized services residing on remote systems via what is, in effect, a wireless extension of the service message bus 124, and/or provide any of the containerized services 122-1 through 122-9 to remote process control systems via the wireless link.

In operation (e.g., to implement PID control), the control service 122-1 may send a request message for specific I/O data to the I/O service 122-2. The service message router 126 forwards the request message from the control service 122-1 to the I/O service 122-2 via the service message bus 124. The I/O service 122-2 handles the request, which may be a request to get process input data from an external physical asset, for example. The I/O service 122-2 responds to the request message by generating a response message with the requested data, which the service message router 126 forwards to the control service 122-1 via the service message bus 124. Alternatively, the control service 122-1 may send a subscription request message (e.g., a request for periodic/published I/O data) to the I/O service 122-2 via the service message router 126 and the service message bus 124. In either case, the I/O service 122-2 sends I/O data to the control service 122-1 for consumption, via the service message router 126 and the service message bus 124.

The control algorithm running within the control service 122-1 processes the I/O input, and proceeds to write to an associated I/O output. The control service 122-1 may construct a "write" message to the I/O service 122-2 via the service message router 126 and the service message bus 124. The I/O service 122-2 will then drive a specific physical output device (e.g., a pump, valve, etc.) in accordance with the I/O output.

Figure 4:
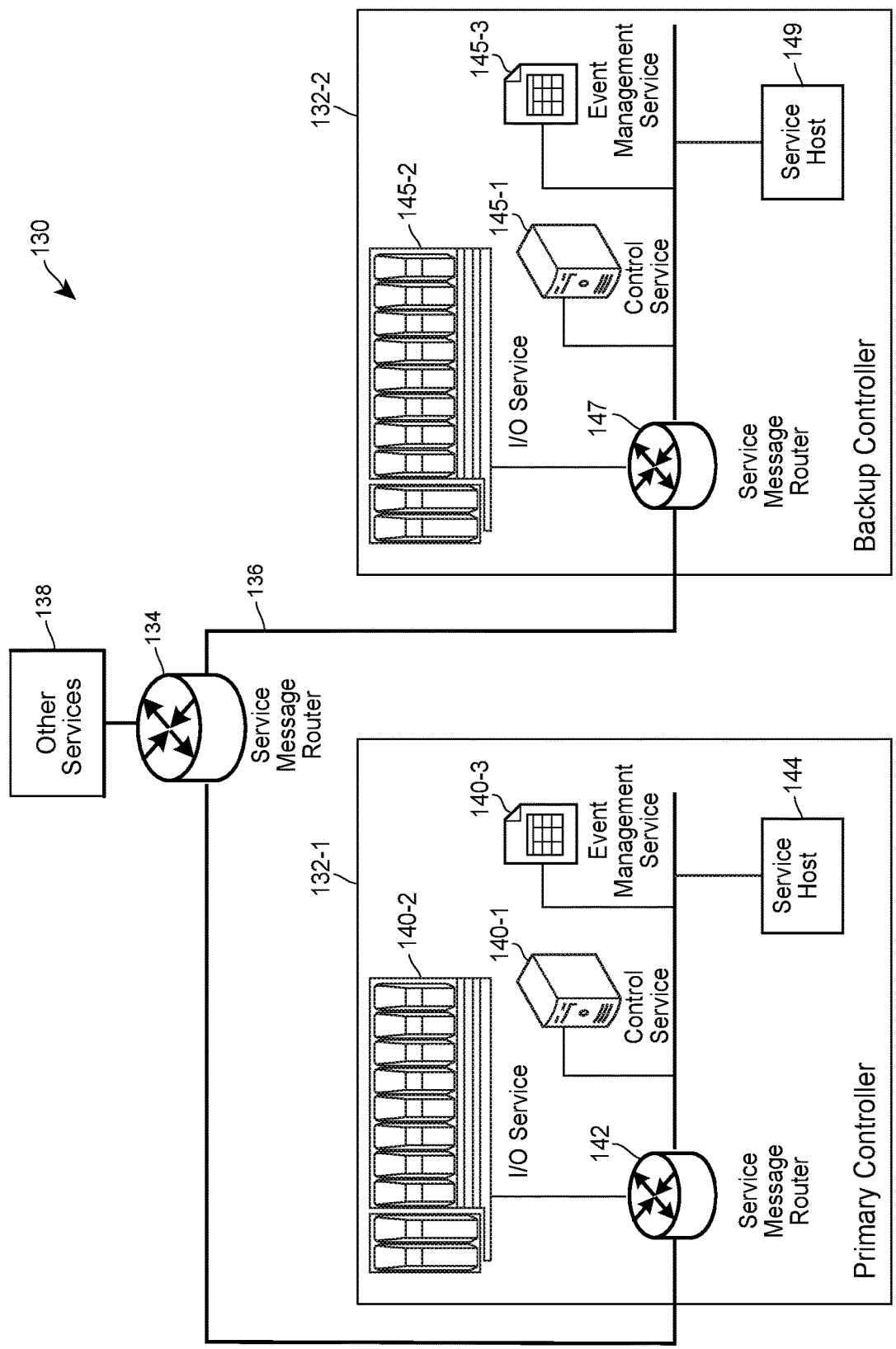
FIG. 4 is a block diagram of a second example implementation of the micro-service control architecture of FIG. 2, in which the process control system implements service redundancy.

Referring next to FIG. 4, a micro-service control architecture 130 provides an example of service host redundancy. Specifically, in this example, the micro-service control architecture 130 includes a primary controller 132-1 and a backup controller 132-2, which may be physical controller devices (e.g., each similar to controller 11 of FIG. 1). Each of the controllers 132-1, 132-2 hosts the same set of services. In particular, the primary controller 132-1 includes a control service 140-1 (e.g., similar to the control service 122-1), an I/O service 140-2 (e.g., similar to the I/O service 122-2), and an event management service 140-3 (e.g., similar to the event management service 122-3), all coupled to a service message router 142 (e.g., similar to the router 110) via a service message bus (e.g., similar to the bus 108). The primary controller 132-1 also includes a service host entity 144 that manages the redundancy lifecycle of services 140-1 through 140-3. The backup controller 132-2 may include identical, or nearly identical, software/components, including a control service 145-1, an I/O service 145-2, an event management service 145-3, a service message router 147, and a service host entity 149. For example, the control service 145-1 may be identical to the control service 140-1, with both services being configured to control the same device or type of device (e.g., valve).

The primary controller 132-1 and the backup controller 132-2 exist within the larger micro-service control architecture 130, and are both communicatively coupled to another service message router 134 via a service message bus 136. The micro-service control architecture 130 may also include other services 138 on the service message bus 136.

In operation, the primary controller 132-1 is initially the active control device, and can respond to services messages received on the service message bus 136. In this example, the backup controller 132-2 is a backup control device in "hot-standby" mode. The services of the backup controller 132-2 (i.e., services 145-1, 145-2, 145-3) do not actively respond to service messages, but may receive copies of service messages sent to the controller 132-1. The controller 132-1 monitors the service message bus 136 for a demand to switch over to the backup controller 132-2. This demand may be active (i.e., a particular control system service requests the switchover), or passive (e.g., the controller 132-1 monitors for a failure condition via one or more control system services, such as event management service 140-3).

The controller 132-1 then sends a message to the backup controller 132-2 with information regarding (e.g., an indication of) the redundancy switchover demand. The backup controller 132-2 acknowledges the switchover request, and initiates a switchover. The controller 132-1 is notified (e.g., by controller 132-2) that the controller 132-2 has taken over, causing the controller 132-1 (i.e., service host entity 144) to reset its redundancy state.

The backup controller 132-2 notifies all services it manages (i.e., services 145-1, 145-2, 145-3) to "take over" and begin responding to messages intended for the primary controller 132-1. All other devices sending messages to the controller 132-2 may need to be tolerant of duplicate messages coming from the primary and backup controllers 132-1, 132-2 until the negotiation of the active and backup roles is completed.

In other embodiments, the controllers 132-1 and 132-2 (and possibly also one or more other, similar controllers) provide their respective services in parallel, in a load-balanced manner. This provides not only the bandwidth-related benefits of load-balancing, but also fault tolerance that is similar to the above example. For example, the controller 132-2 can continue to provide its services (145-1, 145-2, 145-3) if the controller 132-1 fails, and vice versa.

Figure 5:
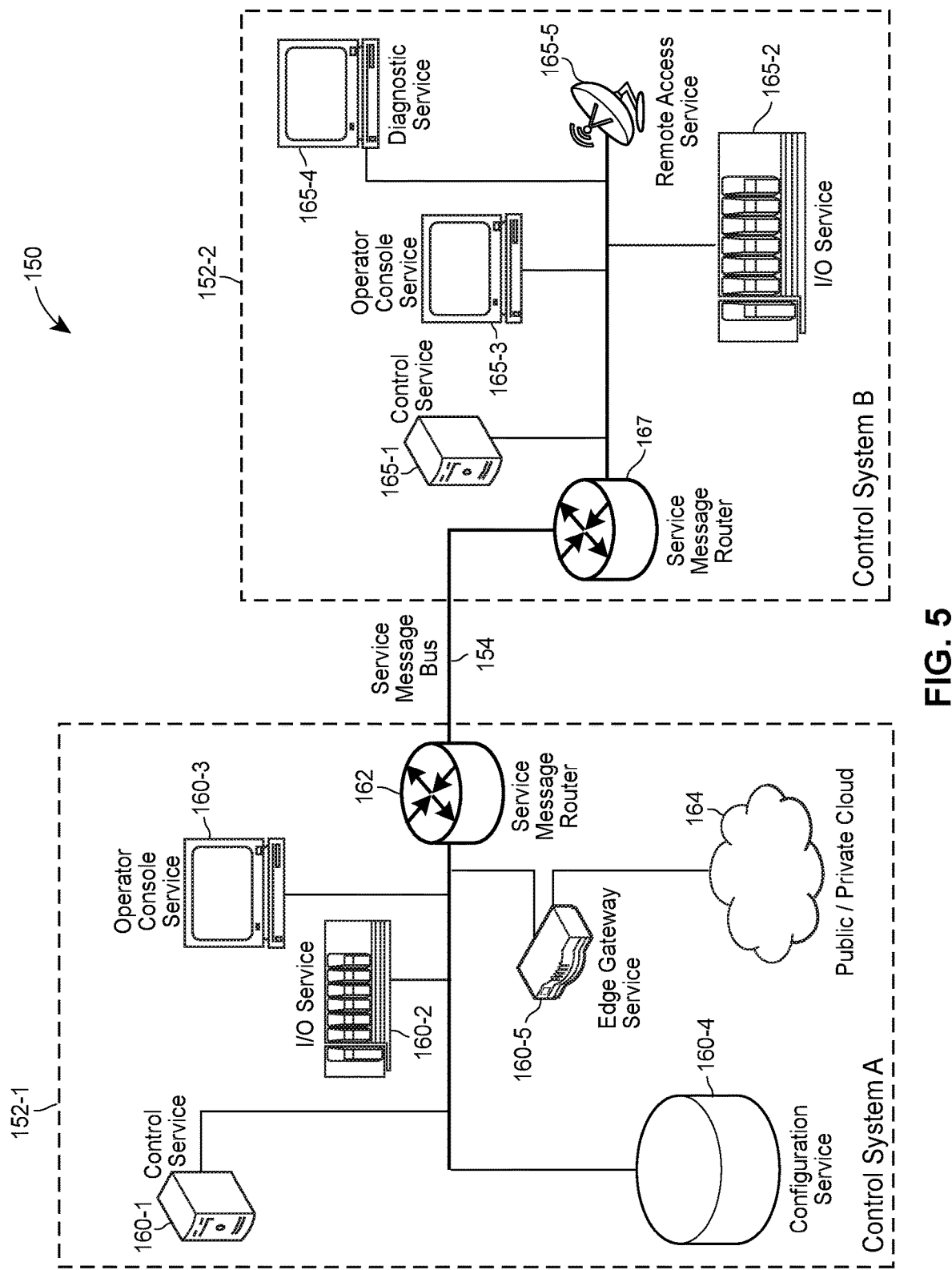
FIG. 5 is a block diagram of a third example implementation of the micro-service control architecture of FIG. 2, in which services of one process control system can interact with services of another process control system.

Referring next to FIG. 5, a micro-service control architecture 150 provides an example of inter-system communication/monitoring. Specifically, in this example, the micro-service control architecture 150 includes a first control system 152-1 ("Control System A") and a second control system 152-2 ("Control System B"), coupled by a service message bus 154. As noted above, the service message bus 154 may be overlaid on any type or types of underlying communication network. Thus, for example, the control system 152-1 may be coupled to the control system 152-2 by a wired network (e.g., HART®, Ethernet, etc.) and/or a wireless network (e.g., WirelessHART®, WiFi, etc.).

In the example of FIG. 5, the control system 152-1 includes a control service 160-1 (e.g., similar to the control service 122-1), an I/O service 160-2 (e.g., similar to the I/O service 122-2), an operator console service 160-3 (e.g., similar to the operator console service 122-4), a configuration service 160-4 (e.g., similar to the configuration service 122-5), and an edge gateway service 160-5 (e.g., similar to the edge gateway service 122-6), all coupled to a service message router 162 (e.g., similar to the router 110) via a service message bus (e.g., similar to the bus 108). The edge gateway service 160-5 is further coupled to a public or private cloud 164 external to the process control systems 152-1 and 152-2.

Also in this example, the control system 152-2 includes a control service 165-1 (e.g., similar to the control service 122-1), an I/O service 165-2 (e.g., similar to the I/O service 122-2), an operator console service 165-3 (e.g., similar to the operator console service 122-4), a diagnostic service 165-4 (e.g., similar to the diagnostic service 122-8), and a remote access service 165-5 (e.g., similar to the remote access service 122-10), all coupled to a service message router 167 (e.g., similar to the router 110) via a service message bus (e.g., similar to the bus 108).

In operation, the operator console service 160-3 of the control system 152-1 is configured to monitor and record I/O data from the other control system 152-2. To this end, the operator console service 160-3 may send a subscription request to the I/O service 165-2 of the control system 152-2. The service message router 162 within the control system 152-1 forwards the request message to the service message router 167 of the control system 152-2. The service message router 167 then forwards the subscription request to the I/O service 165-2. In response, the I/O service 165-2 starts publishing periodic updates of the requested I/O values through the service message routers 167, 162 (and service message buses), to be consumed by the operator console service 160-3 of the control system 152-1 (e.g., presented to the operator via a GUI generated and/or populated by the operator console service 160-3).

Throughout the life of a given process control system, the corresponding service message router may maintain a record of all available service endpoints, and provide for the semantics of addressing different systems connected to the respective service message bus. Any new systems or service endpoints appearing on the service message bus of the process control system may be verified and validated for security, and made available to any service endpoints for communication (e.g., on a first-class basis).

Figure 6:
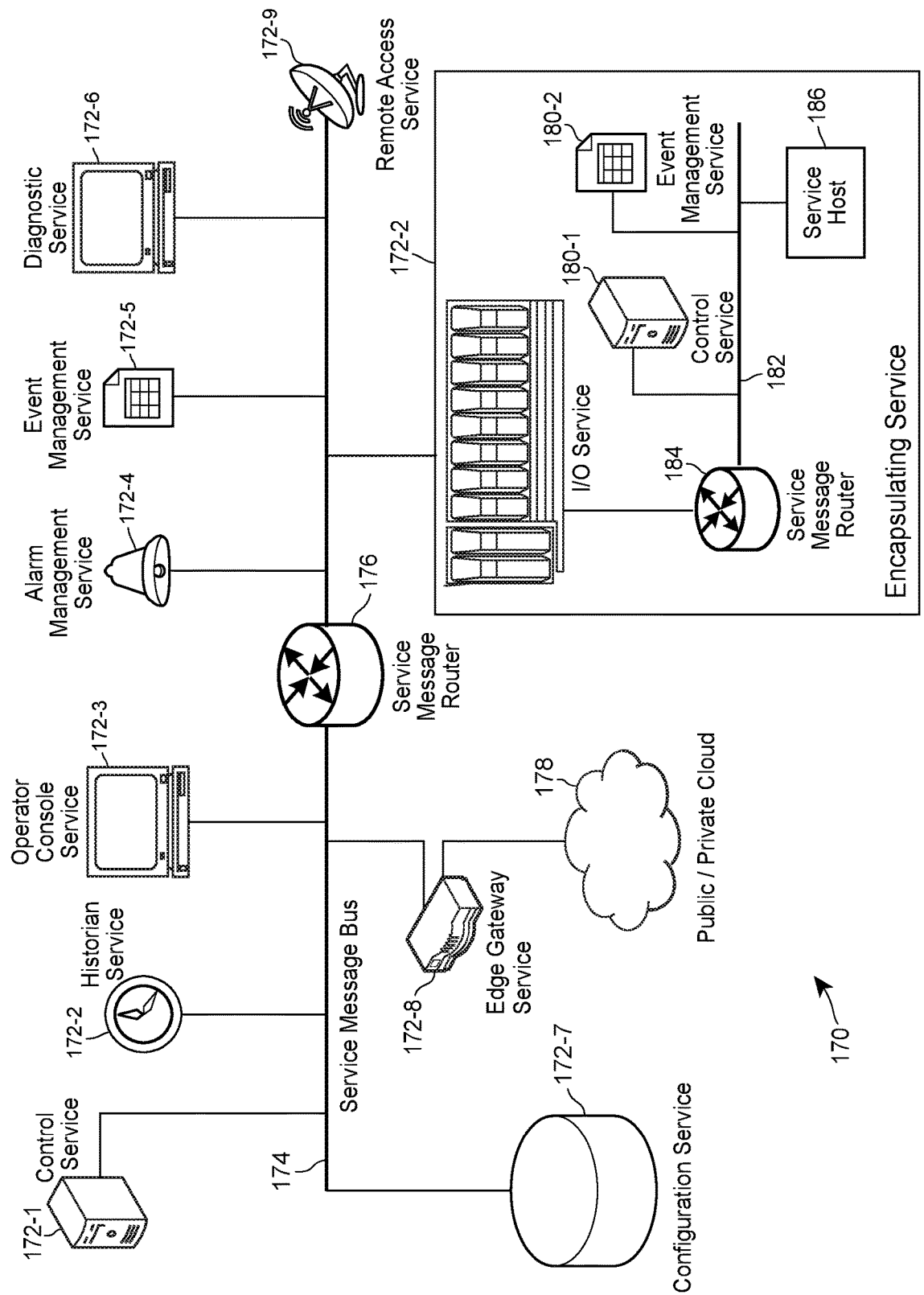
FIG. 6 is a block diagram of a fourth example implementation of the micro-service control architecture of FIG. 2, in which one service of the process control system encapsulates other services of the process control system.

Referring next to FIG. 6, a micro-service control architecture 170 provides an example of service encapsulation. In this example, the micro-service control architecture 170 includes a control service 172-1 (e.g., similar to the control service 122-1), an I/O service 172-2 (e.g., similar to the I/O service 122-2), an operator console service 172-3 (e.g., similar to the operator console service 122-4), an alarm management service 172-4 (e.g., similar to the alarm management service 122-7), an event management service 172-5 (e.g., similar to the event management service 122-3), a diagnostic service 172-6 (e.g., similar to the diagnostic service 122-8), a configuration service 172-7 (e.g., similar to the configuration service 122-5), an edge gateway service 172-8 (e.g., similar to the edge gateway service 122-6), and a remote access service 172-9 (e.g., similar to the remote access service 122-10), all coupled to a service message router 176 (e.g., similar to the router 110) via a service message bus 174 (e.g., similar to the bus 108). The edge gateway service 172-8 is further coupled to a public or private cloud 178 external to the process control system.

In this example, the I/O service 172-2 encapsulates another control service 180-1 and another event management service 180-2. The services 180-1 and 180-2 may be the services 172-1 and 172-5 (respectively), different versions of the services 172-1 and 172-5, or entirely different services, for example. Also coupled to the bus 182 is a service message router 184, and a service host entity 186 that manages the redundancy lifecycle of services 180-1 and 180-2. The I/O service 172-2, encapsulated services 180-1, 180-2, service message router 184, and service host entity 186 may all be hosted or implemented by a single physical device within the process control system, for example, or by multiple physical devices.

In some embodiments, the encapsulated services 180-1, 180-2 are fully addressable, discoverable, and available for communication with the rest of the control system. Moreover, the encapsulated services 180-1, 180-2 may communicate as first-class services (i.e., on a first-class basis, as discussed above) within the control system, but with all traffic passing to the encapsulated service 180-1 or 180-2 being addressed through the encapsulating service 172-2.

Figure 7:
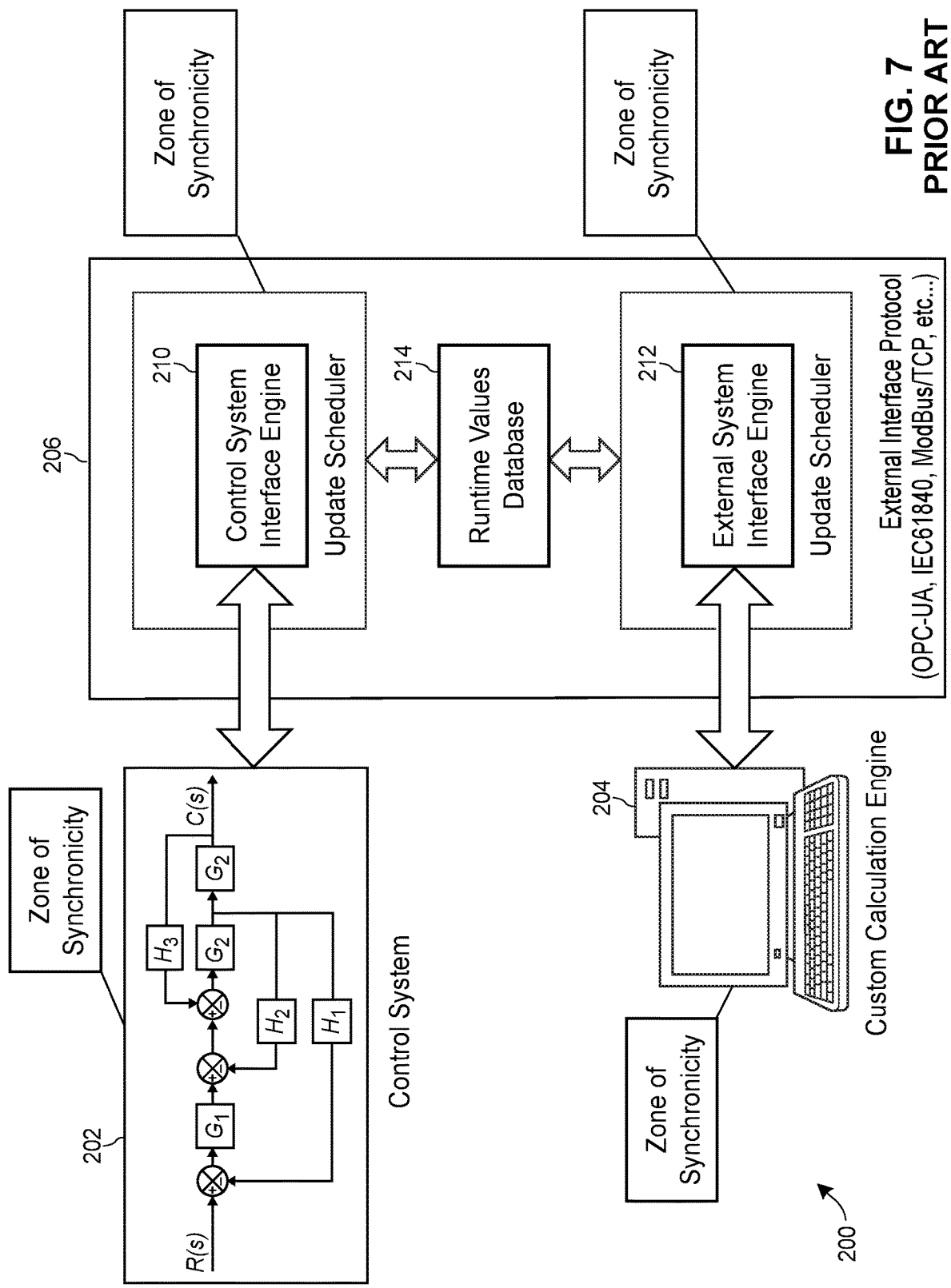
FIG. 7 illustrates a prior art configuration for interfacing with a custom calculation engine.

Modularity, process control capability, and/or design flexibility can be increased not only by utilizing a micro-service control architecture, but also (or instead) by incorporating custom calculation engines running control algorithms external to the process control system. The control algorithm may be one that the process control system is unable to implement itself, for example. FIG. 7 illustrates a conventional configuration 200 in which a control system 202 interfaces with a custom calculation engine 204 via an external interface protocol 206 (e.g., OPC-UA, IEC 61850, ModBus/TCP, etc.). The external interface protocol 206 requires a control system interface engine 210 and an external system interface engine 212, which exchange runtime data via a runtime values database 214.

As indicated in FIG. 7, this conventional configuration 200 includes four independent zones of synchronicity. In a first zone, the control system 202 is configured to process inputs and drive final control elements (field devices) according to a customer-defined control scheduler. In a second zone, on an independently periodic basis, the control system interface engine 210 transfers process control data from the control system 202 for storage in the runtime values database 214, and the control system interface engine 210 transfers process control data from the runtime values database 214 to the control system 202.

In a third zone, again on an independently periodic basis, the external system interface engine 212 transfers process control data from the custom calculation engine 204 for storage in the runtime values database 214, and the external system interface engine 212 transfers process control data from the runtime values database 214 to the custom calculation engine 204. In a fourth zone, the custom calculation engine 204 algorithmically processes inputs and generates outputs according to a customer-defined control scheduler. Each step introduces latency and asynchronous behavior, which can lead to various problems during operation that may be difficult to diagnose and/or remedy.

A novel solution to these problems will now be described with reference to FIGS. 8 through 10.

Figure 8:
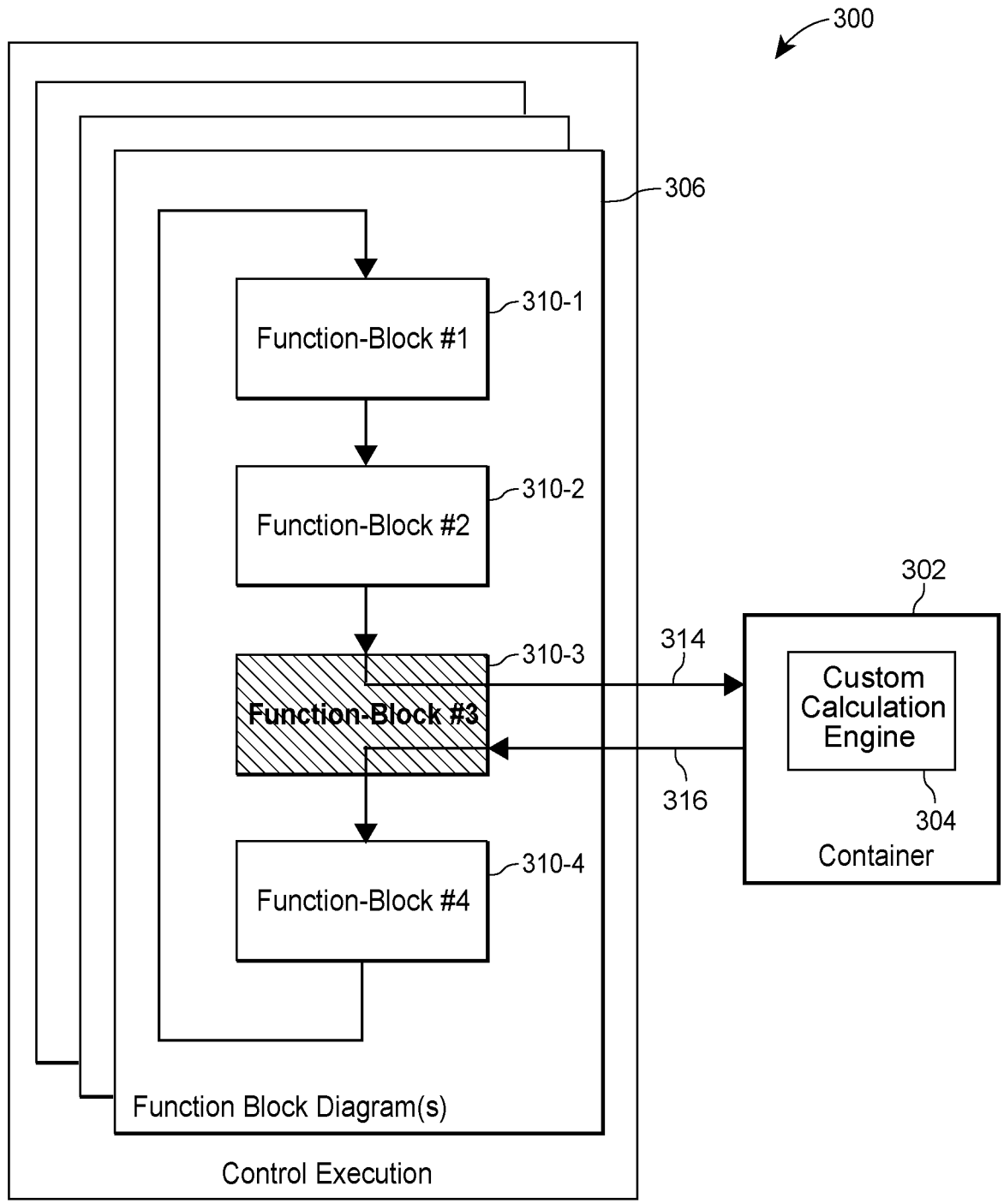
FIG. 8 is a block diagram of an example control execution flow that utilizes a shadow block to interface with a custom calculation engine.

Referring first to FIG. 8, an example control execution flow 300 utilizes a "shadow block" technique to interface with a container 302 containing a custom calculation engine 304 running a control algorithm. The custom calculation engine 304 may execute any type of control algorithm used to drive any type of control element (e.g., to drive any of field devices 15-22 or 40-50), for example. In some embodiments, the custom calculation engine 304 implements a machine learning or AI model (e.g., similar to the machine learning/AI models discussed above with reference to FIG. 2).

The control execution flow 300 may be implemented by the process control system 10 of FIG. 1, for example, with or without utilizing the micro-service control architecture 100 of FIG. 2. In the example of FIG. 8, the process control system generally controls a physical process by utilizing a number of function block diagrams 306 each containing a number of function blocks 310. While FIG. 8 shows three function block diagrams 306, with one of those function block diagrams 306 containing four function blocks 310-1 through 310-4, any suitable number of function block diagrams 306, and any suitable number of function blocks 310 per diagram 306, may be implemented.

Each of function blocks 310-1 through 310-4 (also referred to herein as simply "function blocks 310" for ease of notation) represents a specific control algorithm, or portions of a control algorithm, that is supported by the process control system, and has one or more configurable inputs and outputs. As used herein, the term "control algorithm" may include operations (e.g., integration, adding, filtering, etc.) that are performed on input data to generate output data, or may include other operations needed to control the physical process, such as obtaining input data from a sensor, outputting data that drives a field device, or interfacing with another component (e.g., as is the case with the shadow blocks discussed herein). The function blocks 310 and function block diagrams 306 may be arranged in accordance with the IEC 61131-3 specification, for example.

The execution order is dictated by connections between inputs and outputs of the various function blocks 310. In the example configuration of FIG. 8, for instance, the output of the function block 310-1 drives/triggers the function block 310-2 (i.e., causes the function block 310-2 to generate its own output by operating upon the output of function block 310-1), the output of the function block 310-2 drives/triggers the function block 310-3, the output of the function block 310-3 drives/triggers the function block 310-4, and the output of the function block 310-4 drives/triggers the function block 310-1 in a feedback loop. It is understood that one or more of the function blocks 310 may include additional inputs and/or outputs not shown in FIG. 8 (e.g., an input from a sensor device to function block 310-1, and/or an output from function block 310-4 that drives a field device, etc.).

Function blocks 310-1, 310-2 and 310-4 implement control algorithms that are performed internally by the process control system (e.g., by the controller 11 of process control system 10). For example, the function block 310-1 may obtain sensor data, the function block 310-2 may process (e.g., pre-filter) the sensor data, and the function block 310-4 may use the output of function block 310-3 to drive a field component. Function block 310-3, however, operates as a "shadow block." That is, function block 310-3 (also referred to herein as "shadow block 310-3") acts as an interface to the container 302. In particular, the shadow block 310-3 transfers its input data 314 (i.e., the data output by the function block 310-2) to the custom calculation engine 304 via the container 302, and the engine 304 operates upon that input data 314 to generate output data 316. The shadow block 310-3 then obtains the output data 316 from the custom calculation engine 304 via the container 302, and applies that output data 316 as its own output data to function block 310-4. In other embodiments, the shadow block 310-3 includes some pre- and/or post-processing of the data communicated to and/or from the custom calculation engine 304.

Generally, a shadow block such as shadow block 310-3 represents, as an abstraction to a function block diagram that includes the shadow block (e.g., diagram 306), an algorithm or calculation that is performed outside of the function block diagram. In this manner, a shadow block enables custom calculations to impact the process control system in a first-class manner. Thus, for example, the custom calculation engine 304 (via the shadow block 310-3) is executed just like any function block 310 defined within the function block diagram 306.

The shadow block 310-3 provides isolation of the custom calculation engine 304 from any software entity of the process control system, except for the interface with the shadow block 310-3 itself. Moreover, the arrangement forces the custom calculation engine 304 to operate synchronously with respect to the function block diagram 306. Stated differently, the custom calculation engine 304 executes synchronously through the interface of the shadow block 310-3. This allows for more deterministic and predictable execution of the function block diagram 306, with no need to be concerned about asynchronous execution of the custom calculation engine 304 and related issues (e.g., sampling rates, aliasing, system noise).

As noted above, the custom calculation engine 304 shown in FIG. 8 is containerized (e.g., using an instance of a Docker or LXD image, a Windows container, a BSD or chroot jail, or a virtual machine, etc., as discussed above). In some embodiments, the custom calculation engine 304 is implemented as a control system service (e.g., similar to one of the control system services 102 of FIG. 2 but external to the process control system), with a service API as discussed above. Thus, the shadow block 310-3 may serve as an execution interface to a software container. In some embodiments, the custom calculation engine 304 is "uploaded" as a securely verified container image for consumption by the control system. The container image may then be immediately available for instantiation following a successful upload operation.

By using a shadow block interface, the custom calculation engine 304 can be represented, instantiated and executed in the function block diagram 306. This is an advantage because control system engineering personnel may interact with the custom calculation engine 304 without any formal or specialized training when configuring or monitoring the system. Process alarming, historian interaction, data acquisition, and/or other functions may therefore occur without the need for a specialized custom interface.

The execution time of the shadow block 310-3 is of course dependent upon the execution time of the custom calculation engine 304, and has a direct and linear impact on the total execution time of the function block diagram 306. Care should be taken to ensure that the custom calculation engine 304 does not have a computational complexity that causes the function block diagram 306 to exceed time boundaries of acceptable execution. One way of addressing this is to reduce or limit the algorithmic complexity of the custom calculation engine 304. Another approach is to configure the custom calculation engine 304 for asynchronous operation. Asynchronous operation allows the custom calculation engine 304 to execute its calculation logic in parallel with the function block diagram 306, freeing the execution of the function block diagram 306 from the custom calculation engine 304 (which may be taking a long time to execute). However, because the custom calculation engine 304 is no longer operating synchronously with the function block diagram 306, issues with sampling and aliasing may occur. This in turn may cause the control strategy to operate on stale or invalid data, and so care must be taken to ensure that the custom calculation engine 304 execution times are accounted for within the control strategy.

In some embodiments, failures and issues within the custom calculation engine 304 (or the associated containerized service) are reflected to the control strategy through a "block status" of the shadow block 310-3 interface. Additionally, the shadow block 310-3 may experience what is colloquially known as "mode shedding," meaning that the shadow block 310-3 changes operational modes to reflect the state of the custom calculation engine 304 or its container service. This allows the control strategy to handle failures within the custom calculation engine 304 in a predefined manner that is appropriate to the process control system.

Custom calculation engines and containers such as engine 304 and container 302 may be validated by the control system manufacturer or another entity to ensure that the custom calculation engine and container do not negatively impact execution of function block diagrams or the associated control strategy. The validation analysis may include, for example, (1) analyzing computational complexity of the custom control algorithm; (2) analyzing dependencies of the container and the custom calculation engine (for static and/or dynamic dependencies); (3) analyzing worst-case execution time of a dynamic computational algorithm executed within the container; (4) analyzing information security to ensure that the container is not recording, redirecting, or consuming data other than what is defined within the shadow block interface with the container; (5) analyzing compile-time runtime analysis of the custom calculation engine and container instantiation to ensure that the deployed custom calculation engine container image instance is well-behaved during execution (e.g., to prevent a potential third party from inserting malicious logic into the custom calculation engine container, exposing the control system to an information security breach); and/or (6) verifying that the custom calculation engine container is created, instantiated, signed and deployed by the control system manufacturer or another known entity (e.g., once again, to prevent a potential third party from inserting malicious logic into the custom calculation engine container, exposing the control system to an information security breach).

Figure 9:
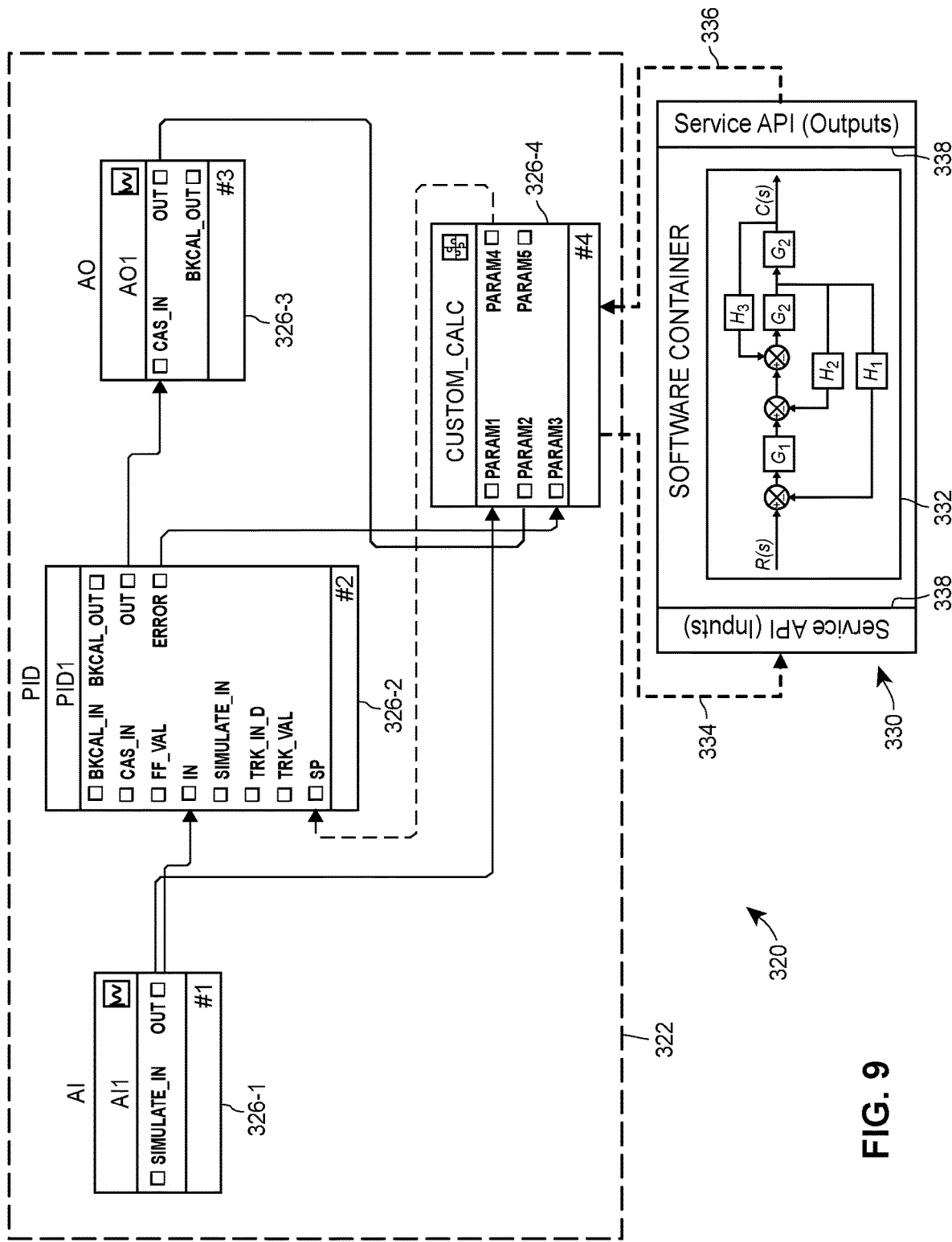
FIG. 9 is a block diagram of an example control execution flow utilizing specific function blocks.

For exemplary purposes, FIG. 9 depicts a control execution flow 320 that utilizes more specific types of function blocks. In particular, the control execution flow 320 includes a function block diagram 322 (e.g., an IEC 61131-3 function block diagram) that contains function blocks 326-1 through 326-4, with the function block 326-1 being an analog input function block that obtains analog sensor data and outputs the sensor data (or data indicative thereof), the function block 326-2 executing a PID algorithm on the output of the function block 326-1 (and on set-point data fed back from the function block 326-4) to generate a control signal and an error signal, the function block 326-3 being an analog output function block that processes the output of the function block 326-2 to drive a field device (e.g., one of field devices 15-22 or 40-50) and provide feedback to the function block 326-4, and the function block 326-4 being a shadow block that interfaces with a container 330 containing a custom calculation engine 332 that runs external to the function block diagram 322. The custom calculation engine 332 may provide functionality that is not provided by any function block available for inclusion in the function block diagram 322, for example.

The shadow block 326-4 receives, as input, output data from both the function block 326-1 and the function block 326-3, and provides that as input data 334 to the custom calculation engine 330. In the depicted example, the custom calculation engine 332 processes that input data 334 to generate output data 336 representing a current set-point, and provides that output data 336 to the shadow block 326-4. The shadow block 326-4 then uses that output data 336 as its own output, which drives a set-point input of the PID function block 326-2. In the example depicted in FIG. 9, the custom calculation engine 332 is implemented as a containerized service with a service API 338 as an interface.

As noted above in connection with FIG. 8, the shadow block 326-4 may generally represent the custom calculation engine 332 as an abstraction within the function block diagram 322, and enforce synchronous execution upon the custom calculation engine 332. In some embodiments, the shadow block 326-4 enables the custom calculation engine 332 to run in a first-class manner (i.e., like any of the function blocks 326-1 through 326-3).

Figure 10:
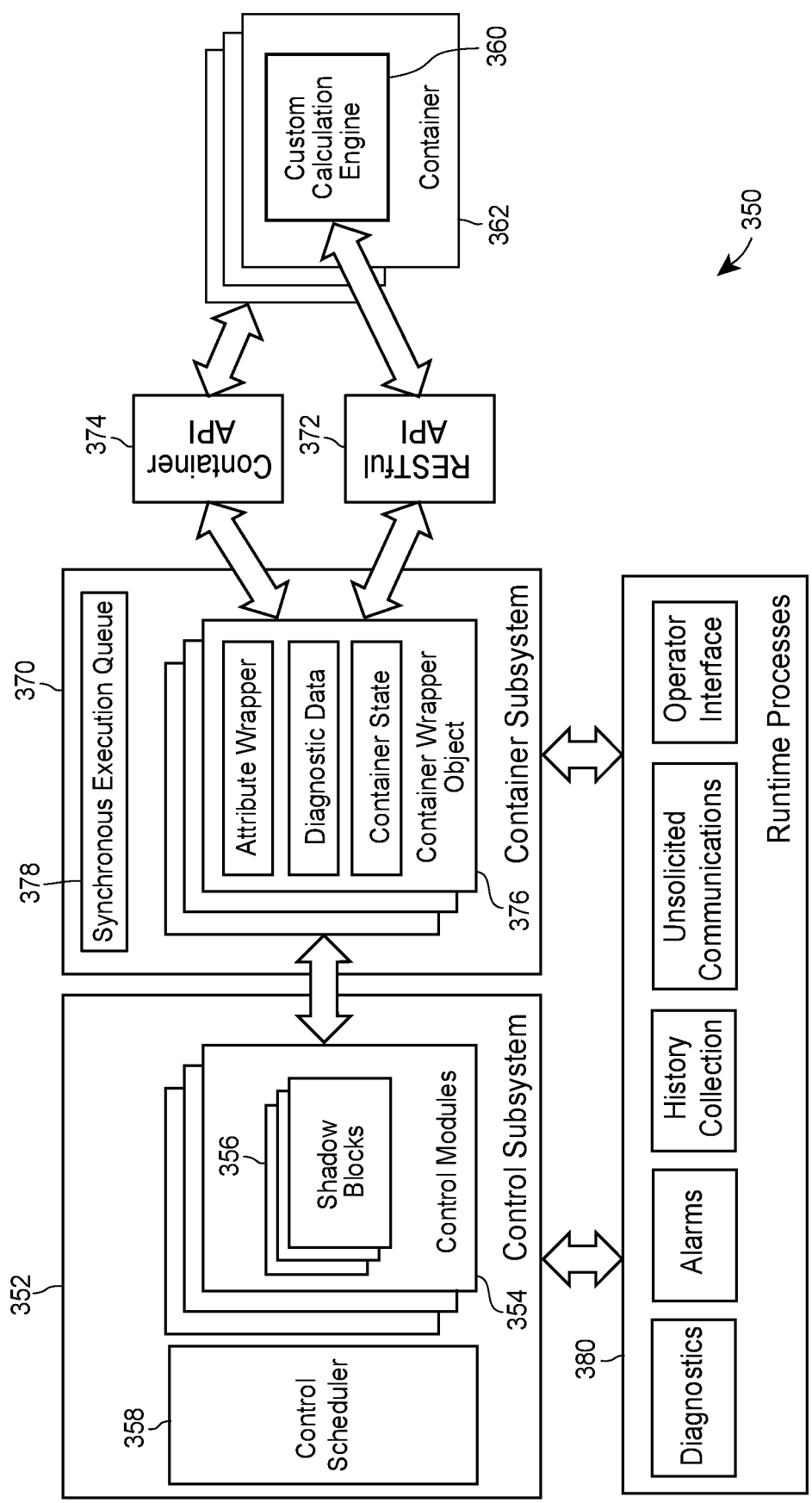
FIG. 10 is a block diagram of an example process control system architecture utilizing shadow blocks.

FIG. 10 depicts a more detailed process control system architecture 350 that utilizes shadow blocks, according to one embodiment. The example architecture 350 includes a control subsystem 352 containing a number of function block diagrams 354, at least one of which includes (among other function blocks) one or more shadow blocks 356. The control system 352 also includes a control scheduler 358. The architecture 350 also includes one or more custom calculation engines 360 in one or more respective containers 362 (e.g., Docker or LXD containers), and a container subsystem 370 communicatively coupled to the control subsystem 352, to the custom calculation engine 360 (via a RESTful API 372), and to the container 362 (via a container API 374). The container subsystem 370 includes one or more container wrapper objects 376 and a synchronous execution queue 378. The control subsystem 352 and the container subsystem 370 communicate with a number of runtime processes 380.

The container subsystem 370 manages the objects 376, which represent the containers 362 to the control subsystem 352 (e.g., to the system 10 of FIG. 1, or a portion thereof). The container wrapper objects 376 serve as interface objects to send data to and retrieve data from the respective ones of containers 362. The runtime processes 380 may access attribute data that is specific to a particular container 362, through a namespace (e.g., Docker namespace) for each instantiated container 362. The namespace may be identical to the identifier of the shadow block 356 that is associated with the container 362, but is targeted to the container subsystem 370.

As one example, to install the containers 362 and shadow blocks 356, container definitions may be installed on a field gateway (or other suitable device) through a firmware update. Containers may exist on the file system as, for example, Docker or LXD package files. To ensure security and integrity, the package files may be verified using asymmetric key pair signing (e.g., as supported by Docker). If this signing check fails, downloads that attempt to instantiate the related shadow block 356 may fail and trigger an appropriate failure indicator/status.

The custom calculation engine 360 may also be "uploaded" as a securely verified image of container 362 for consumption by the field gateway or other device. The container 362 image may be sent to the field gateway or other device via Secure File Copy or another suitable secure file transfer protocol. The container 362 image may contain import data that enables the field gateway (or other device) to instantiate the container 362, process a download for the associated shadow block 356, register the unique namespace for the custom calculation engine container 362 and associated shadow block 356, and include any runtime database configuration changes necessary for proper consumption of the new container 362 image for the custom calculation engine 360.

In some embodiments, the containers 362 function similarly to Batch Phases, whereby the container 362 and associated shadow block 356 will be instantiated into the system runtime upon download of the field gateway or other device. The download script for a container 362 may dictate whether the container 362 executes synchronously with shadow block 356 execution, or asynchronously (e.g., on a one-element-deep queue demand). If asynchronous execution is selected for a container 362, and the shadow block 356 has executed twice (or some other pre-defined threshold number of times) before the container 362 is able to finish custom calculation logic for the first execution, then an output transfer failure may occur for that shadow block 356, and a hardware alert will engage to signify slippage of the container 362.

The shadow block 356 to container 362 relationships may be defined as "stateful" or "stateless." In some embodiments, if the container 362 of the custom calculation engine 360 maintains a state during normal execution (i.e., stateful operation), then the shadow block 356 must maintain a 1:1 cardinality with the respective container 362. If the container 362 does not maintain state during normal execution (i.e., stateless operation), however, then it is possible to have N:1 cardinality of shadow blocks 356 to a single container 362 (image instance). Each shadow block 356, upon execution, will send its inputs for stateless calculation, with an associated outputs transfer. This approach allows for a more efficient design, whereby a container 362 does not require multiple instantiations for stateless operation.

As with other function blocks, each shadow block 356 will execute in the order defined within the respective function block diagram 354. In one embodiment, the shadow block 356 has three different modes of operation, and maintains a block status appropriate to the mode of execution, as follows:

"Out of Service" mode: The shadow block 356 will not process inputs to the shadow block 356, and all outputs will have "bad" status. Configuration logic wired to the outputs of the shadow block 356 treat this output status as an indication that the custom calculation engine 360 within the respective container 362 is not executing, and/or that the outputs should not be trusted. The container subsystem 370 may drive the shadow block mode to "Out of Service" for the following conditions:
1. The container 362 is no longer reachable through the respective RESTful API 372.
2. The container 362 has been deleted or removed as reflected in the respective container API 374.
3. The container 362 has requested that the shadow block 356 reflect "Out of Service" mode through the respective RESTful API 372.

"Manual" mode: The shadow block 356 will not execute the logic of the respective container 362, but will allow inputs and outputs to be manually controlled by the operator. This is similar to the "Out of Service" mode discussed above, but the output value and status is configurable by the operator. This can be useful for debugging or testing control logic downstream from the shadow block 356.

"Automatic" mode: The shadow block 356 will pass input values and status to the respective container 362 for processing. The outputs of the respective custom calculation engine 360 will be delivered to the shadow block 356 along with value and status as defined by the custom calculation engine 360. This may be considered the "normal" block mode for execution of the custom calculation engine 360 via the shadow block 356.

The RESTful API 372 enables the custom calculation engine 360 within the container 362 to specify the values for the respective shadow block 356, as well as output status. The respective shadow block 356 also will allow the status to be dictated by the custom calculation engine 360 via the respective RESTful API 372.

The container subsystem 370 serves as a proxy for each actual container 362 object, and an interface that interprets data from containers 362 by translating into data specific to the format of the runtime data (e.g., into DeltaV™-specific runtime data). In some embodiments, each container wrapper object 376 maintains the following:

Shadow block 356 and control module (function block diagram) 354 assignments to the associated container 362 instances. The namespace for the container 362 may be identical to the shadow block 356 name as defined within the download script.

The most recently sent (cached) input and most recently received output values to and from the associated container 362.

The attribute wrapper and cached data specific to the assigned container 362.

The assigned license status and enforcement for the container 362. In one embodiment, if the license has expired, the respective shadow block 356 will transition to "Out of Service" mode as defined above, the block status will become "bad," and all outputs will be marked with "bad" status. Licenses for a particular container 362 with the associated custom calculation engine 360 may be on-demand, subscription-based, or perpetual, for example.

Diagnostic data regarding the assigned container 362, including (1) the total container 362 execution time since boot, (2) the maximum container 362 execution time, (3) whether in synchronous or asynchronous mode, (4) memory utilization, (5) custom diagnostic parameters, (6) slippage in asynchronous mode, (7) impact to block status and mode shedding, and/or (8) licensing state.

The RESTful API 372 allows for bidirectional communication between a respective container 362 and the control subsystem 352, to execute custom calculations and to drive execution in coordination with the associated shadow block 356. The container subsystem 370 may manage the communication with the containers 362 directly. In some embodiments, the RESTful API 372 contains the following interfaces:

Inputs Transfer: The container 362 consumes its inputs with this interface, and begins execution of the custom calculation logic. Input values may include status, and are taken into account by the custom calculation engine 360 of the container 362.

Outputs Transfer: The container 362 delivers calculated outputs as demanded by the most recent inputs transfer. Values and status may be defined by the custom calculation engine 360.

Shadow Block Mode State: The container 362 may drive the respective shadow block 356 into any of the supported block modes (e.g., as defined above).

Shadow Block Status: The container 362 may drive the respective shadow block 356 overall status to any function block status value, to signify good status or issues within the respective custom calculation engine 360, for example.

In some embodiments and/or scenarios, a signed custom calculation engine 360 can be instantiated on a remote control device, and operate with normal behavior, so long as the respective RESTful API 372 is able to communicate across the intervening data network in a reliable manner.

Figure 11:
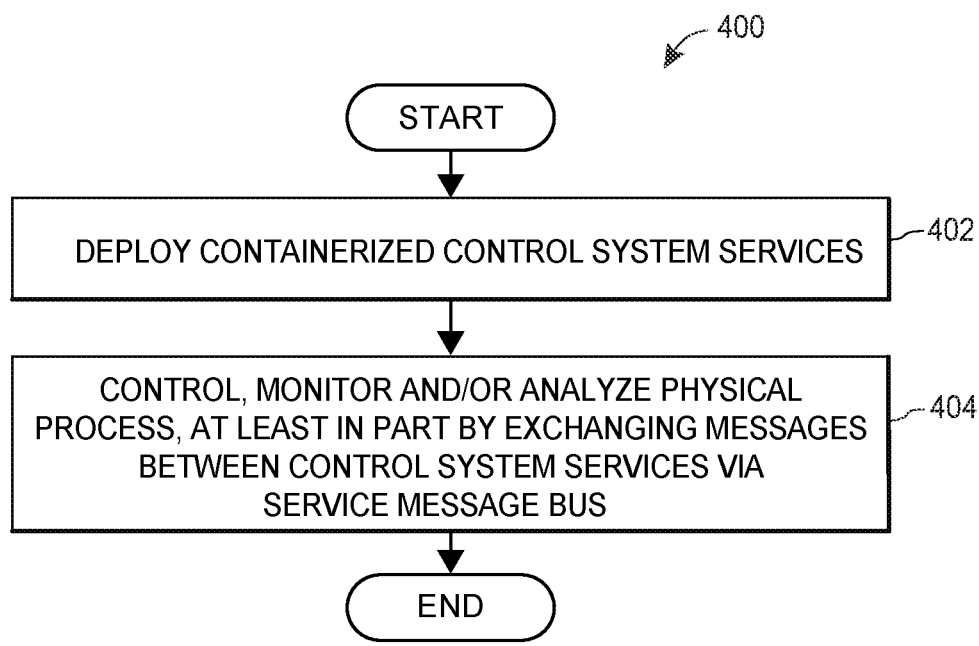
FIG. 11 is a flow diagram of an example method for implementing a modular control system architecture.

FIG. 11 illustrates a flow diagram representing an exemplary method 400 of implementing a modular, micro-service control system architecture. The method 400 may be executed by one or more physical devices of a process control system that implements a physical process, such as the process control system 10 of FIG. 1, for example. For instance, the method 400 may be implemented by the controller 11, and/or by one or more other physical devices in the process control system 10 (e.g., operator workstation 8, server 12, one or more of field devices 15-22 and/or 40-50, I/O device 26 and/or 28, network device 35, etc.).

At block 402, containerized control system services are deployed. The control system services are configured to execute different functions associated with the process control system, and each service provides a respective interface (e.g., an interface 104) that defines interactivity with other control system services. The containerized services may be instances of Docker or LXD images, for example, or any other independent and self-deployable computational vessels. The services may be deployed by creating instances of images corresponding to the various services, within the physical device(s) that host the respective services, for example. The service types (e.g., control logic service, control execution service, diagnostic service, etc.) may be any of the types of services discussed above in connection with FIGS. 2 through 6, for example, or any other type of service relating to a process control system, and may include encapsulated and/or redundant services as discussed above.

At block 404, a physical process is controlled, monitored and/or analyzed, at least in part by exchanging messages, via a service message bus (e.g., the service message bus 108 of FIG. 2), between the control system services deployed at block 402. The exchanged messages conform to the respective interfaces of the control system services. If the interfaces are APIs, for example, the exchanged messages conform to the syntax and parameters of the respective APIs. The messages may be exchanged using a router, such as the service message router 110 of FIG. 2, for example. Moreover, the messages may be exchanged using any suitable type of wired and/or wireless network(s) and associated communication protocol(s) (e.g., HART®, WirelessHART®, WiFi, Bluetooth®, etc.). However, the service-based control protocol of the messages may be independent of the communication protocol(s) of the wired and/or wireless networks.

In some embodiments, the method 400 includes one or more additional blocks not shown in FIG. 11. For example, the method 400 may include a first additional block in which a registry is maintained by at least one physical device of the process control system. The registry (e.g., service registry 112) may record each control system service that is added to the process control system. The method may also include a second additional block in which each of the control system services is notified (e.g., by the same physical device) when a new service is added to the registry. Alternatively, the method 400 may include an additional block in which, for each control system service, a respective physical device that hosts the service notifies all other services that the service is available.

As another example, the method 400 may include an additional block in which additional messages are exchanged between at least one of the control system services and at least one control system service of another process control system (e.g., via service message routers of both process control systems).

As another example, the method 400 may include an additional block in which a first one of the control system services is migrated from a first physical device to a second physical device of the process control system (e.g., by creating an instance of an image corresponding to the first service at the second physical device).

Figure 12:
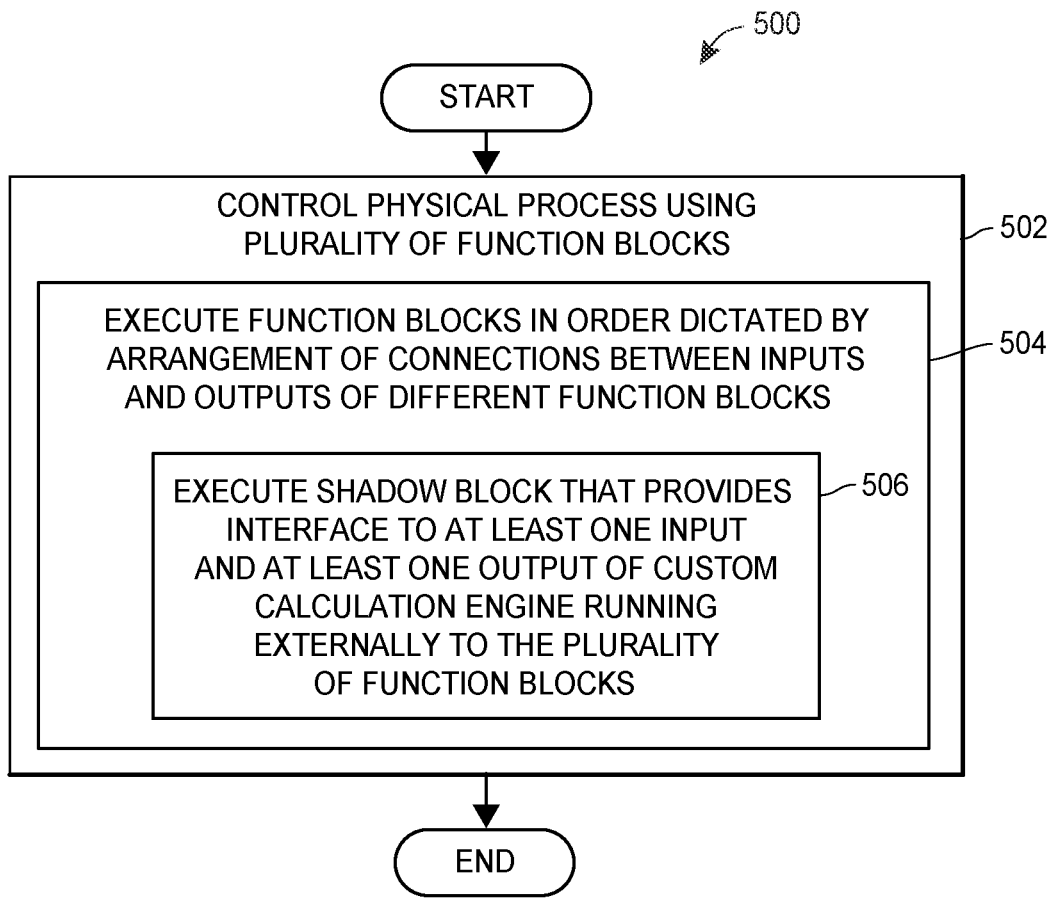
FIG. 12 is a flow diagram of an example method for incorporating custom calculations in a process control system.

FIG. 12 illustrates a flow diagram representing an exemplary method 500 of incorporating custom calculations in a process control system. The method 500 may be executed by one or more physical devices of a process control system that implements a physical process, such as the process control system 10 of FIG. 1, for example. For instance, the method 500 may be implemented by the controller 11, and/or by one or more other physical devices in the process control system 10 (e.g., one or more of field devices 15-22 and/or 40-50, operator workstation 8, I/O device 26 and/or 28, network device 35, etc.).

At block 502, a physical process is controlled using a plurality of function blocks (e.g., function blocks arranged within a function block diagram, per IEC 61131-3). Each of the function blocks has one or more respective inputs and/or one or more respective outputs, and implements a respective control algorithm. Block 502 includes, at block 504, executing the function blocks in the order dictated by the arrangement of connections between the inputs and outputs of different function blocks. The function blocks may include function blocks similar to the function blocks 310 or 326 of FIG. 8 or 9, for example.

Block 504 includes, at block 506, executing a shadow block, of the plurality of function blocks, that provides an interface to at least one input and at least one output of a custom calculation engine running externally to the plurality of function blocks (i.e., external to the function block diagram). Executing the shadow block may include enforcing an execution order in which the shadow block does not provide data from the output(s) of the custom calculation engine to a subsequent function block until after the shadow block provides data, from a previous function block, to the input(s) of the custom calculation engine.

In some embodiments, block 506 includes transferring data received at one or more inputs of the shadow block to a container (e.g., an instance of a Docker or LXD image, etc.) that includes the custom calculation engine (e.g., via an API of the container), and transferring data output by the custom calculation engine from the container to one or more outputs of the shadow block (e.g., via the API of the container). In some embodiments, the shadow block provides the interface via the API of the container and a container wrapper object that translates container data to runtime data interpretable by the process control system. The container wrapper object may maintain assignment of the shadow block to the container, cached values of data transferred to and/or from the container, attributes of the container, license status of the container, and/or diagnostic data associated with the container, for example.

In some embodiments exhibiting N:1 cardinality (as discussed above), block 502 further includes executing one or more additional shadow blocks, of the plurality of function blocks, that provide one or more additional, respective interfaces to the input(s) and output(s) of the custom calculation engine.

In some embodiments, the method 500 includes one or more additional blocks not shown in FIG. 12. For example, the method 500 may include, prior to block 502, a first additional block in which an image of the custom calculation engine is obtained from a third party via an Internet link, and a second additional block in which an instance of the image is created at a physical device of the process control system (e.g., at a physical device that implements some or all of the method 500).

As another example, the method 500 may include an additional block in which a status or mode of the shadow block is changed to match/mirror a status or mode of the custom calculation engine (e.g., based on information that the custom calculation engine communicates via a RESTful API).

As yet another example, the method 500 may include an additional block in which a status of the shadow block indicates at least one of (1) whether the custom calculation engine is available, (2) whether the custom calculation engine is being manually overridden, or (3) whether the custom calculation engine is operating within the process control system.

Embodiments of the techniques described in the present disclosure may include any number of the following aspects, either alone or combination:

1. A method of implementing a modular control system architecture, the method comprising: deploying a plurality of containerized, independently-executable control system services configured to execute different functions associated with a process control system that implements a physical process, each of the plurality of control system services providing a respective interface that defines interactivity with other control system services; and controlling, monitoring and/or analyzing the physical process, at least in part by exchanging messages between the plurality of control system services via a service message bus, the exchanged messages conforming to the respective interfaces of the plurality of control system services.

2. The method of aspect 1, wherein deploying the plurality of control system services includes deploying each of the plurality of control system services as an instance of a Docker image.

3. The method of aspect 1, wherein deploying the plurality of control system services includes deploying each of the plurality of control system services as an instance of an LXD image.

4. The method of aspect 1, wherein deploying the plurality of control system services includes deploying each of the plurality of control system services as a Windows container.

5. The method of aspect 1, wherein deploying the plurality of control system services includes deploying each of the plurality of control system services as a BSD jail or a chroot jail.

6. The method of aspect 1, wherein deploying the plurality of control system services includes deploying each of the plurality of control system services as a virtual machine.

7. The method of any one of aspects 1 through 6, comprising implementing a centralized discovery procedure, at least in part by: maintaining, by at least one physical device of the process control system, a registry that records each control system service added to the process control system; and notifying, by the at least one physical device, each of the plurality of control system services when a new control system service is added to the registry.

8. The method of any one of aspects 1 through 6, comprising implementing a decentralized discovery procedure, at least in part by: for each service of the plurality of control system services, notifying, by a respective physical device that hosts the service, all other services of the plurality of control system services that the service is available.

9. The method of any one of aspects 1 through 8, wherein each service of the plurality of control system services is associated with a different database containing information specific to the service.

10. The method of any one of aspects 1 through 9, wherein deploying the plurality of control system services includes deploying a database service that provides other control system services with access to a shared database.

11. The method of any one of aspects 1 through 10, wherein exchanging the messages between the plurality of control system services via the service message bus includes exchanging the messages using a service message router of the process control system.

12. The method of any one of aspects 1 through 11, comprising: exchanging additional messages between (i) at least one of the plurality of control system services and (ii) at least one control system service deployed in another process control system, wherein exchanging the additional messages includes exchanging the additional messages using the service message router of the process control system and a service message router of the other process control system.

13. The method of aspect 11, wherein deploying the plurality of control system services includes encapsulating a first service of the plurality of control system services within a second service of the plurality of control system services, at least in part by creating an instance of the service message router within the second service.

14. The method of any one of aspects 1 through 13, wherein the respective interfaces of the plurality of control system services are respective application programming interfaces (APIs), and wherein all interdependencies between the plurality of control system services are marginalized to the respective APIs of the plurality of control system services.

15. The method of any one of aspects 1 through 14, wherein: the process control system includes a plurality of physical devices; and deploying the plurality of control system services includes, for each service of the plurality of control system services, creating an instance of an image corresponding to the service at a respective one of the plurality of physical devices.

16. The method of aspect 15, wherein each physical device hosting one of the plurality of control system services implements a respective service host entity that manages redundancy lifecycle of the control system service hosted by the physical device.

17. The method of any one of aspects 1 through 16, wherein the process control system includes a plurality of physical devices, and wherein the method comprises migrating a first service of the plurality of control system services from a first device of the plurality of physical devices to a second device of the plurality of control system services, at least in part by creating an instance of an image corresponding to the first service at the second device.

18. The method of any one of aspects 1 through 17, wherein the process control system includes a plurality of physical devices, and wherein deploying the plurality of control system services includes creating a plurality of instances corresponding to a first service of the plurality of control system services at respective devices of the plurality of physical devices.

19. The method of aspect 18, wherein controlling, monitoring and/or analyzing the physical process includes implementing, collectively by the respective devices, the first service in parallel, in a load-balanced manner.

20. The method of aspect 18, wherein controlling, monitoring and/or analyzing the physical process includes: implementing the first service at a first device of the respective devices; and in response to a failure of the first device, implementing the first service at a second device of the respective devices.

21. The method of any one of aspects 1 through 20, wherein exchanging the messages between the plurality of control system services via the service message bus includes exchanging the messages via one or more communication networks associated with one or more respective communication protocols, and wherein the messages conform to a service-based control protocol that is independent of the one or more respective communication protocols.

22. The method of aspect 21, wherein the one or more communication networks include a wireless communication network.

23. The method of any one of aspects 1 through 22, wherein the plurality of control system services includes two or more services selected from the group consisting of: a control logic service; a control execution service; a control communication service; and a control configuration service.

24. The method of aspect 23, wherein the plurality of control system services includes one or more services selected from the group consisting of: an operator console service; an alarm management service; an event management service; a diagnostic service; a remote access service; an edge gateway service; an input/output service; a data historian service; an external and/or peripheral input/output translation service; a key performance indication service; a data monitoring service; a machine learning service; an artificial intelligence (AI) service; a message pass-through service; and a safety logic service.

25. The method of aspect 23, wherein: the plurality of control system services includes the control logic service; and deploying the plurality of control system services includes (i) obtaining an image of the control logic service from a third party via an Internet link, and (ii) creating an instance of the image of the control logic service at a physical device of the process control system.

26. A process control system comprising: a plurality of physical devices, including one or more field devices configured to perform physical operations within a physical process implemented by the process control system; and one or more communication networks that communicatively couple at least some of the plurality of physical devices to each other and support a service message bus, wherein one or more devices of the plurality of physical devices collectively host a plurality of containerized, independently-executable control system services configured to execute different functions associated with the process control system, each of the plurality of control system services providing a respective interface that defines interactivity with other control system services, and the process control system controls, monitors and/or analyzes the physical process the physical process at least in part by the plurality of control system services exchanging messages via the service message bus, the exchanged messages conforming to the respective interfaces of the plurality of control system services.

27. The process control system of aspect 26, wherein each of the plurality of control system services is an instance of a Docker image or an instance of an LXD image.

28. The process control system of aspect 26, wherein deploying the plurality of control system services includes deploying each of the plurality of control system services as a Windows container, a BSD jail, a chroot jail, or a virtual machine.

29. The process control system of any one of aspects 26 through 28, wherein: at least one device of the plurality of physical devices hosts a registry that records each control system service added to the process control system; and the at least one device notifies each of the plurality of control system services when a new control system service is added to the registry.

30. The process control system of any one of aspects 26 through 28, wherein for each service of the plurality of control system services, the respective device that hosts the service notifies all other services of the plurality of control system services that the service is available.

31. The process control system of any one of aspects 26 through 30, comprising: for each service of the plurality of control system services, a respective memory associated with the respective device that hosts the service, wherein the respective memory stores a database containing information specific to the service.

32. The process control system of any one of aspects 26 through 31, wherein the plurality of control system services includes a database service that provides other control system services with access to a shared database.

33. The process control system of any one of aspects 26 through 32, wherein: one of the plurality of physical devices implements a service message router; and the plurality of control system services exchange the messages via the service message bus using the service message router.

34. The process control system of any one of aspects 26 through 33, wherein the respective interfaces of the plurality of control system services are respective application programming interfaces (APIs), and wherein all interdependencies between the plurality of control system services are marginalized to the respective APIs of the plurality of control system services.

35. The process control system of any one of aspects 26 through 34, wherein each physical device hosting one of the plurality of control system services implements a respective service host entity that manages redundancy lifecycle of the control system service hosted by the physical device.

36. The process control system of any one of aspects 26 through 35, wherein the one or more communication networks include a wireless communication network.

37. The process control system of any one of aspects 26 through 36, wherein the plurality of control system services includes two or more services selected from the group consisting of: a control logic service; a control execution service; a control communication service; and a control configuration service.

38. The process control system of aspect 37, wherein the plurality of control system services includes one or more services selected from the group consisting of: an operator console service; an alarm management service; an event management service; a diagnostic service; a remote access service; an edge gateway service; an input/output service; a data historian service; an external and/or peripheral input/output translation service; a key performance indication service; a data monitoring service; a machine learning service; an artificial intelligence (AI) service; a message pass-through service; and a safety logic service.

39. A method of incorporating custom calculations in a process control system, the method comprising: controlling a physical process using a plurality of function blocks, wherein each of the plurality of function blocks (i) has one or more respective inputs and/or one or more respective outputs, and (ii) implements a respective control algorithm, controlling the physical process includes executing the plurality of function blocks in an order dictated by an arrangement of connections between inputs and outputs of different function blocks of the plurality of function blocks, and executing the plurality of function blocks includes executing a shadow block, of the plurality of function blocks, that provides an interface to at least one input and at least one output of a custom calculation engine running externally to the plurality of function blocks.

40. The method of aspect 39, wherein executing the shadow block includes: transferring data received at one or more inputs of the shadow block to a container that includes the custom calculation engine; and transferring data output by the custom calculation engine from the container to one or more outputs of the shadow block.

41. The method of aspect 40, wherein the container is an instance of a Docker image, an instance of an LXD image, a Windows container, a BSD jail, a chroot jail, or a virtual machine.

42. The method of aspect 40, wherein: the shadow block provides the interface to the at least one input and the at least one output of the customer calculation engine via an application programming interface (API) of the container; and transferring the data received at the one or more inputs of the shadow block to the container, and transferring the data output by the custom calculation engine from the container to the one or more outputs of the shadow block, both include transferring data via the API of the container.

43. The method of aspect 42, wherein the shadow block provides the interface to the at least one input and the at least one output of the customer calculation engine via (i) the API of the container and (ii) a container wrapper object that translates container data to runtime data that is interpretable by the process control system.

44. The method of aspect 43, comprising maintaining, by the container wrapper object, one or more of: assignment of the shadow block to the container; cached values of data transferred to and/or from the container; attributes of the container; license status of the container; and diagnostic data associated with the container.

45. The method of any one of aspects 40 through 44, comprising, prior to controlling the physical process: obtaining an image of the custom calculation engine from a third party via an Internet link; and creating an instance of the image of the custom calculation engine at a physical device of the process control system.

46. The method of any one of aspects 39 through 45, wherein: the plurality of function blocks are function blocks of a function block diagram as specified by the International Electrotechnical Commission (IEC) 61131-3 specification; and the custom calculation engine is implemented outside of the function block diagram.

47. The method of any one of aspects 39 through 46, wherein: at least a first function block of the plurality of function blocks is an input block that retrieves sensor data generated by a first field device of the process control system; and at least a second function block of the plurality of function blocks is an output block that drives a second field device of the process control system.

48. The method of any one of aspects 39 through 47, wherein executing the shadow block includes enforcing an execution order in which the shadow block does not provide data from the at least one output of the custom calculation engine to a subsequent function block of the plurality of function blocks until after the shadow block provides data, from a previous function block of the plurality of function blocks, to the least one input of the custom calculation engine.

49. The method of any one of aspects 39 through 48, comprising: changing a status or mode of the shadow block to match a status or mode of the custom calculation engine.

50. The method of any one of aspects 39 through 49, wherein controlling the physical process includes: executing one or more additional shadow blocks, of the plurality of function blocks, that provide one or more additional respective interfaces to the at least one input and the at least one output of the custom calculation engine.

51. The method of any one of aspects 39 through 50, comprising: maintaining a status of the shadow block that indicates at least one of (i) whether the custom calculation engine is available, (ii) whether the custom calculation engine is being manually overridden, or (iii) whether the custom calculation engine is operating within the process control system.

52. One or more control devices configured to: control a physical process of a process control system using a plurality of function blocks, wherein each of the plurality of function blocks (i) has one or more respective inputs and/or one or more respective outputs, and (ii) implements a respective control algorithm, controlling the physical process includes executing the plurality of function blocks in an order dictated by an arrangement of connections between inputs and outputs of different function blocks of the plurality of function blocks, and executing the plurality of function blocks includes executing a shadow block, of the plurality of function blocks, that provides an interface to at least one input and at least one output of a custom calculation engine running externally to the plurality of function blocks.

53. The one or more control devices of aspect 52, wherein executing the shadow block includes: transferring data received at one or more inputs of the shadow block to a container that includes the custom calculation engine; and transferring data output by the custom calculation engine from the container to one or more outputs of the shadow block.

54. The one or more control devices of aspect 53, wherein the container is an instance of a Docker image or an instance of an LXD image.

55. The one or more control devices of aspect 53, wherein: the shadow block provides the interface to the at least one input and the at least one output of the customer calculation engine via an application programming interface (API) of the container; and transferring the data received at the one or more inputs of the shadow block to the container, and transferring the data output by the custom calculation engine from the container to the one or more outputs of the shadow block, both include transferring data via the API of the container.

56. The one or more control devices of aspect 55, wherein the shadow block provides the interface to the at least one input and the at least one output of the customer calculation engine via (i) the API of the container and (ii) a container wrapper object that translates container data to runtime data that is interpretable by the process control system.

57. The one or more control devices of aspect 56, wherein the container wrapper object maintains one or more of: assignment of the shadow block to the container; cached values of data transferred to and/or from the container; attributes of the container; license status of the container; and diagnostic data associated with the container.

58. The one or more control devices of any one of aspects 53 through 57, wherein: the plurality of function blocks are function blocks of a function block diagram as specified by the International Electrotechnical Commission (IEC) 61131-3 specification; and the custom calculation engine is implemented outside of the function block diagram and by one or more devices other than the one or more control devices.

59. The one or more control devices of any one of aspects 52 through 58, wherein: at least a first function block of the plurality of function blocks is an input block that retrieves sensor data generated by a first field device of the process control system; and at least a second function block of the plurality of function blocks is an output block that drives a second field device of the process control system.

60. The one or more control devices of any one of aspects 52 through 59, wherein executing the shadow block includes enforcing an execution order in which the shadow block does not provide data from the at least one output of the custom calculation engine to a subsequent function block of the plurality of function blocks until after the shadow block provides data, from a previous function block of the plurality of function blocks, to the least one input of the custom calculation engine.

61. The one or more control devices of any one of aspects 52 through 60, wherein one of the one or more control devices maintains a status of the shadow block that indicates at least one of (i) whether the custom calculation engine is available, (ii) whether the custom calculation engine is being manually overridden, or (iii) whether the custom calculation engine is operating within the process control system.

62. The one or more control devices of any one of aspects 52 through 61, wherein the one or more control devices each comprise a respective processor and a respective memory, the respective processors executing instructions stored in the respective memories to implement the plurality of function blocks.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed:

1. A method of implementing a modular control system architecture, the method comprising:
deploying a plurality of containerized, independently-executable control system services configured to execute different functions associated with a process control system that implements a physical process in a field environment of a process plant, each of the plurality of control system services providing a respective interface that defines interactivity with other control system services, wherein the respective interfaces of the plurality of control system services are respective application programming interfaces (APIs), and wherein all interdependencies between the plurality of control system services are marginalized to the respective APIs of the plurality of control system services;
controlling, monitoring and/or analyzing the physical process, at least in part by exchanging messages between the plurality of control system services via a service message bus, the exchanged messages conforming to the respective interfaces of the plurality of control system services; and
implementing a decentralized discovery procedure, at least in part by:
for each service of the plurality of control system services, notifying, by a respective physical device that hosts the service, all other services of the plurality of control system services that the service is available.

2. The method of claim 1, wherein deploying the plurality of control system services includes deploying each of the plurality of control system services as an instance of a Docker image.

3. The method of claim 1, wherein deploying the plurality of control system services includes deploying each of the plurality of control system services as an instance of an LXD image.

4. The method of claim 1, wherein deploying the plurality of control system services includes deploying each of the plurality of control system services as a Windows container.

5. The method of claim 1, wherein deploying the plurality of control system services includes deploying each of the plurality of control system services as a BSD jail or a chroot jail.

6. The method of claim 1, wherein deploying the plurality of control system services includes deploying each of the plurality of control system services as a virtual machine.

7. The method of claim 1, comprising implementing a centralized discovery procedure, at least in part by:
   maintaining, by at least one physical device of the process control system, a registry that records each control system service added to the process control system; and
   notifying, by the at least one physical device, each of the plurality of control system services when a new control system service is added to the registry.

8. The method of claim 1, wherein each service of the plurality of control system services is associated with a different database containing information specific to the service.

9. The method of claim 1, wherein deploying the plurality of control system services includes deploying a database service that provides other control system services with access to a shared database.

10. The method of claim 1, wherein exchanging the messages between the plurality of control system services via the service message bus includes exchanging the messages using a service message router of the process control system.

11. The method of claim 10, comprising:
   exchanging additional messages between (i) at least one of the plurality of control system services and (ii) at least one control system service deployed in another process control system, wherein exchanging the additional messages includes exchanging the additional messages using the service message router of the process control system and a service message router of the other process control system.

12. The method of claim 10, wherein:
   deploying the plurality of control system services includes encapsulating a first service of the plurality of control system services within a second service of the plurality of control system services, at least in part by creating an instance of the service message router within the second service.

13. The method of claim 1, wherein:
   the process control system includes a plurality of physical devices; and
   deploying the plurality of control system services includes, for each service of the plurality of control system services, creating an instance of an image corresponding to the service at a respective one of the plurality of physical devices.

14. The method of claim 13, wherein each physical device hosting one of the plurality of control system services implements a respective service host entity that manages redundancy lifecycle of the control system service hosted by the physical device.

15. The method of claim 1, wherein the process control system includes a plurality of physical devices, and wherein the method comprises:
   migrating a first service of the plurality of control system services from a first device of the plurality of physical devices to a second device of the plurality of control system services, at least in part by creating an instance of an image corresponding to the first service at the second device.

16. The method of claim 1, wherein the process control system includes a plurality of physical devices, and wherein deploying the plurality of control system services includes:
   creating a plurality of instances corresponding to a first service of the plurality of control system services at respective devices of the plurality of physical devices.

17. The method of claim 16, wherein controlling, monitoring and/or analyzing the physical process includes:
   implementing, collectively by the respective devices, the first service in parallel, in a load-balanced manner.

18. The method of claim 16, wherein controlling, monitoring and/or analyzing the physical process includes:
   implementing the first service at a first device of the respective devices; and
   in response to a failure of the first device, implementing the first service at a second device of the respective devices.

19. The method of claim 1, wherein exchanging the messages between the plurality of control system services via the service message bus includes exchanging the messages via one or more communication networks associated with one or more respective communication protocols, and wherein the messages conform to a service-based control protocol that is independent of the one or more respective communication protocols.

20. The method of claim 19, wherein the one or more communication networks include a wireless communication network.

21. The method of claim 1, wherein the plurality of control system services includes two or more services selected from the group consisting of:
   a control logic service;
   a control execution service;
   a control communication service; and
   a control configuration service.

22. The method of claim 21, wherein the plurality of control system services includes one or more services selected from the group consisting of:
   an operator console service;
   an alarm management service;
   an event management service;
   a diagnostic service;
   a remote access service;
   an edge gateway service;
   an input/output service;
   a data historian service;
   an external and/or peripheral input/output translation service;
   a key performance indication service;
   a data monitoring service;
   a machine learning service;
   an artificial intelligence (AI) service;
   a message pass-through service; and
   a safety logic service.

23. The method of claim 21, wherein:
   the plurality of control system services includes the control logic service; and
   deploying the plurality of control system services includes (i) obtaining an image of the control logic service from a third party via an Internet link, and (ii) creating an instance of the image of the control logic service at a physical device of the process control system.

24. A process control system comprising:
a plurality of physical devices, including one or more field devices configured to perform physical operations within a physical process in a field environment of a process plant, wherein the physical process is implemented by the process control system; and
one or more communication networks that communicatively couple at least some of the plurality of physical devices to each other and support a service message bus,
wherein
one or more devices of the plurality of physical devices collectively host a plurality of containerized, independently-executable control system services configured to execute different functions associated with the process control system, each of the plurality of control system services providing a respective interface that defines interactivity with other control system services, wherein the respective interfaces of the plurality of control system services are respective application programming interfaces (APIs), and wherein all interdependencies between the plurality of control system services are marginalized to the respective APIs of the plurality of control system services,
the process control system controls, monitors and/or analyzes the physical process the physical process at least in part by the plurality of control system services exchanging messages via the service message bus, the exchanged messages conforming to the respective interfaces of the plurality of control system services, and
for each service of the plurality of control system services, the respective device that hosts the service notifies all other services of the plurality of control system services that the service is available.

25. The process control system of claim 24, wherein each of the plurality of control system services is an instance of a Docker image or an instance of an LXD image.

26. The process control system of claim 24, wherein deploying the plurality of control system services includes deploying each of the plurality of control system services as a Windows container, a BSD jail, a chroot jail, or a virtual machine.

27. The process control system of claim 24, wherein:
at least one device of the plurality of physical devices hosts a registry that records each control system service added to the process control system; and
the at least one device notifies each of the plurality of control system services when a new control system service is added to the registry.

28. The process control system of claim 24, comprising:
for each service of the plurality of control system services, a respective memory associated with the respective device that hosts the service, wherein the respective memory stores a database containing information specific to the service.

29. The process control system of claim 24, wherein the plurality of control system services includes a database service that provides other control system services with access to a shared database.

30. The process control system of claim 24, wherein:
one of the plurality of physical devices implements a service message router; and
the plurality of control system services exchange the messages via the service message bus using the service message router.

31. The process control system of claim 24, wherein each physical device hosting one of the plurality of control system services implements a respective service host entity that manages redundancy lifecycle of the control system service hosted by the physical device.

32. The process control system of claim 24, wherein the one or more communication networks include a wireless communication network.

33. The process control system of claim 24, wherein the plurality of control system services includes two or more services selected from the group consisting of:
a control logic service;
a control execution service;
a control communication service; and
a control configuration service.

34. The process control system of claim 33, wherein the plurality of control system services includes one or more services selected from the group consisting of:
an operator console service;
an alarm management service;
an event management service;
a diagnostic service;
a remote access service;
an edge gateway service;
an input/output service;
a data historian service;
an external and/or peripheral input/output translation service;
a key performance indication service;
a data monitoring service;
a machine learning service;
an artificial intelligence (AI) service;
a message pass-through service; and
a safety logic service.

* * * * *

UNITED STATES PATENT AND TRADEMARK OFFICE
CERTIFICATE OF CORRECTION

| | | |
|---|---|---|
| PATENT NO. | : 11,635,980 B2 | Page 1 of 1 |
| APPLICATION NO. | : 16/577053 | |
| DATED | : April 25, 2023 | |
| INVENTOR(S) | : Mark J. Nixon et al. | |

It is certified that error appears in the above-identified patent and that said Letters Patent is hereby corrected as shown below:

On the Title Page

At page 2, in Column 1, item (56), under "OTHER PUBLICATIONS", Line 6, "Emergin" should be -- Emerging --.

In the Specification

At Column 14, Line 37, "system)." should be -- system. --.

In the Claims

At Column 39, Line 13, "wherein" should be -- wherein: --.

At Column 39, Line 29, "the physical process the physical process" should be -- the physical process --.

Signed and Sealed this
Twentieth Day of January, 2026

John A. Squires
*Director of the United States Patent and Trademark Office*